United States Patent

Gagne et al.

(10) Patent No.: US 8,985,364 B2
(45) Date of Patent: Mar. 24, 2015

(54) WALL MOUNTING APPARATUS AND FRAME ASSEMBLY

(71) Applicants: Jean-Guy Gagne, Etobicoke (CA); James W. Rogers, Toronto (CA)

(72) Inventors: Jean-Guy Gagne, Etobicoke (CA); James W. Rogers, Toronto (CA)

(73) Assignee: Brainwave Research Corporation, Ontario (CA)

( * ) Notice: Subject to any disclaimer, the term of this patent is extended or adjusted under 35 U.S.C. 154(b) by 0 days.

(21) Appl. No.: 13/656,157

(22) Filed: Oct. 19, 2012

(65) Prior Publication Data

US 2013/0036703 A1    Feb. 14, 2013

Related U.S. Application Data

(63) Continuation-in-part of application No. 13/101,758, filed on May 5, 2011, now Pat. No. 8,777,035.

(60) Provisional application No. 61/550,085, filed on Oct. 21, 2011.

(51) Int. Cl.

| B65D 8/18 | (2006.01) |
|---|---|
| H02G 3/12 | (2006.01) |
| H02G 3/36 | (2006.01) |
| H04B 1/38 | (2006.01) |
| H02G 3/14 | (2006.01) |

(52) U.S. Cl.
CPC .............. *H02G 3/121* (2013.01); *H02G 3/36* (2013.01); *H04B 1/38* (2013.01); *H02G 3/123* (2013.01); *H02G 3/14* (2013.01); *H02G 3/125* (2013.01); *H02G 3/126* (2013.01)
USPC ........... 220/4.02; 220/3.3; 220/3.5; 220/3.94; 52/656.1

(58) Field of Classification Search
USPC .......... 52/204.1, 220.8, 645, 656.1; 220/4.02, 220/3.3, 3.5, 3.6, 3.9, 3.92, 3.94, 8, 4.24, 220/3.7; 174/57, 58, 559, 563, 561; 248/231.91; 439/535, 538; 40/739, 741
See application file for complete search history.

(56) References Cited

U.S. PATENT DOCUMENTS

| 2,788,187 | A | * | 4/1957 | De Mont et al. ............. 248/27.1 |
| 3,115,265 | A | * | 12/1963 | Mulkey et al. ................ 220/3.5 |
| 3,168,613 | A | * | 2/1965 | Palmer ............................ 174/50 |
| 3,572,536 | A | * | 3/1971 | Wehner ......................... 220/535 |
| 3,729,572 | A | * | 4/1973 | Helin .............................. 174/66 |

(Continued)

OTHER PUBLICATIONS

International Search Report for related International Patent Application No. PCT/CA2012/000963 mailed on Feb. 27, 2013, 4 pgs.

(Continued)

*Primary Examiner* — Robert Canfield
*Assistant Examiner* — Matthew Gitlin
(74) *Attorney, Agent, or Firm* — Ditthavong & Steiner, P.C.

(57) ABSTRACT

A self-supporting apparatus can be placed in an opening in an existing wall substrate. A frame assembly is configured with a perimeter that can be adjusted to correspond to the opening of the wall substrate. Opposing frame portions are movable in opposite directions with respect to each other to be expandable for contact with the opening. Each frame portion comprises a first side having a detent on one surface and a second side with at least one groove on a surface thereof. The surfaces of the opposing frame portions face each other. The detents and grooves are dimensioned to provide engagement, respectively, between grooves and dents of facing frame portion surfaces.

14 Claims, 35 Drawing Sheets

(56) References Cited

U.S. PATENT DOCUMENTS

| | | | | |
|---|---|---|---|---|
| 3,749,815 A | * | 7/1973 | Boatwright et al. | 174/66 |
| 3,864,512 A | * | 2/1975 | Meadow | 174/66 |
| 4,027,097 A | * | 5/1977 | Gillemot | 174/66 |
| 4,087,624 A | * | 5/1978 | Hitchcock | 174/57 |
| 4,892,212 A | * | 1/1990 | Andreyko | 220/3.3 |
| 4,955,825 A | * | 9/1990 | Groth et al. | 439/535 |
| 5,044,987 A | * | 9/1991 | Tihanyi | 439/560 |
| 5,158,478 A | * | 10/1992 | Schuplin | 439/538 |
| 5,211,580 A | * | 5/1993 | Schuplin | 439/538 |
| 5,378,854 A | * | 1/1995 | Hoover | 174/53 |
| 6,093,890 A | * | 7/2000 | Gretz | 174/58 |
| 6,102,360 A | | 8/2000 | Clegg et al. | |
| 6,346,674 B1 | * | 2/2002 | Gretz | 174/58 |
| 6,484,979 B1 | | 11/2002 | Medlin, Jr. | |
| 6,508,445 B1 | * | 1/2003 | Rohmer | 248/200 |
| 6,803,521 B2 | * | 10/2004 | Vrame | 174/58 |
| 7,112,744 B1 | * | 9/2006 | DeCosta | 174/66 |
| D548,572 S | * | 8/2007 | DeCosta | D8/353 |
| 7,273,982 B1 | * | 9/2007 | Lalancette et al. | 174/58 |
| 7,554,036 B1 | * | 6/2009 | DeCosta | 174/66 |
| 7,692,094 B1 | * | 4/2010 | DeCosta | 174/66 |
| 7,829,809 B2 | * | 11/2010 | Bitz et al. | 200/303 |
| 8,129,617 B2 | * | 3/2012 | Nakayama et al. | 174/50 |
| 8,333,356 B2 | * | 12/2012 | Ernst et al. | 248/304 |
| 8,350,153 B1 | * | 1/2013 | Decosta | 174/66 |
| 8,777,035 B2 | * | 7/2014 | Gagne et al. | 220/4.02 |
| 2004/0257181 A1 | * | 12/2004 | Aubert Capella | 335/18 |
| 2007/0251713 A1 | | 11/2007 | Thornton et al. | |
| 2011/0259883 A1 | * | 10/2011 | Decosta | 220/3.94 |

OTHER PUBLICATIONS

Written Opinion for related International Patent Application No. PCT/CA2013/000963 mailed on Feb. 27, 2013, 6 pgs.

Notification of Transmittal of the International Search Report and the Written Opinion of the International Searching Authority, or the Declaration for related International Patent Application No. PCT/CA2012/000963 mailed on Feb. 27, 2013, 1 pg.

* cited by examiner

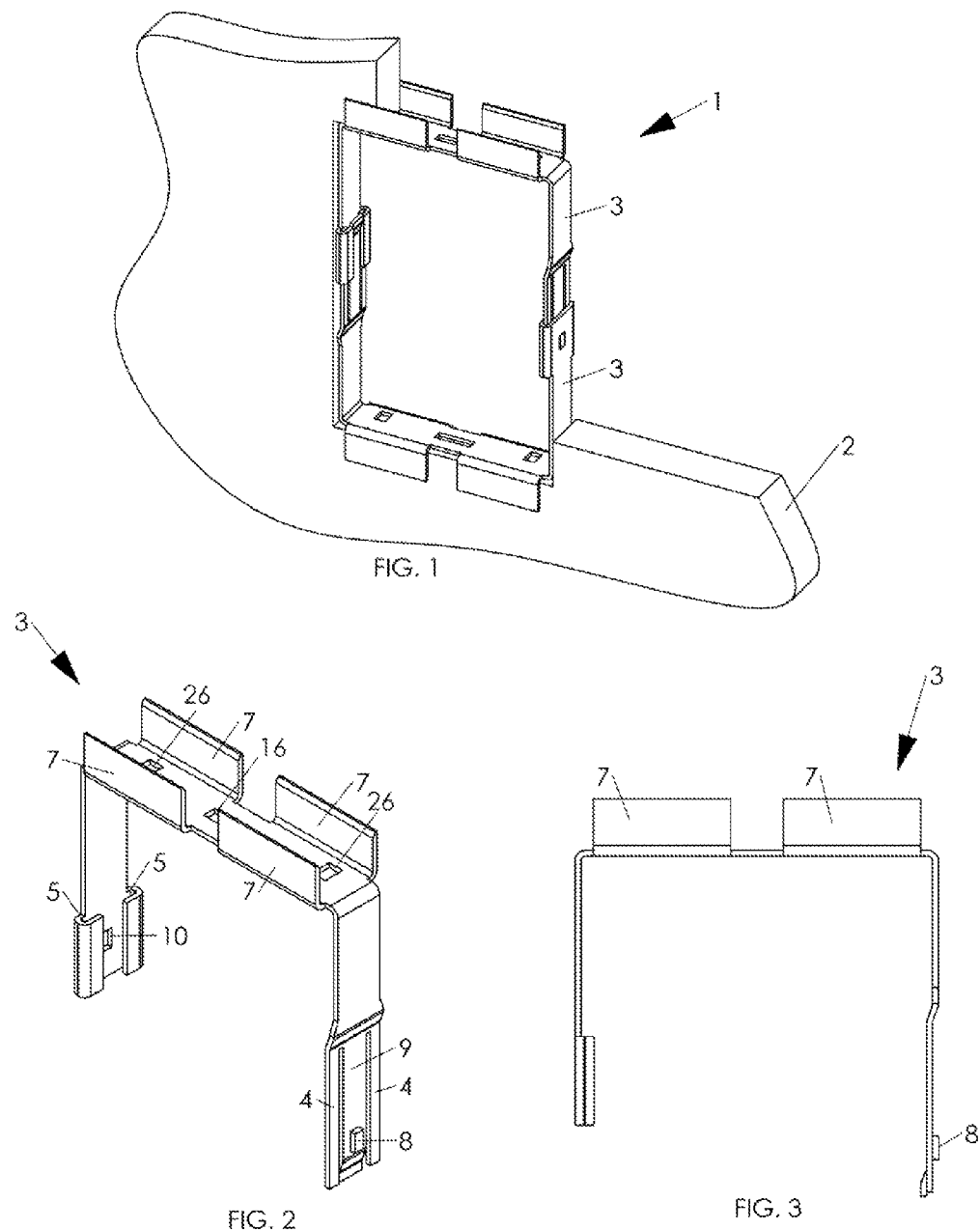

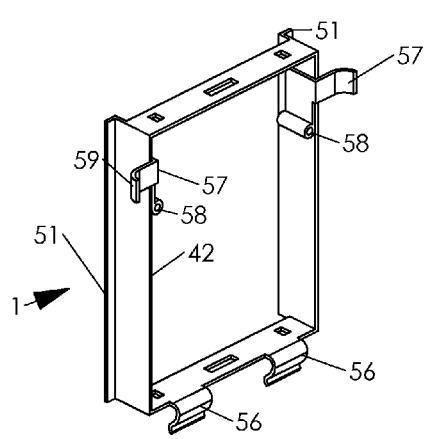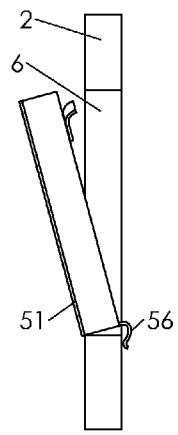
FIG. 20a
FIG. 20b
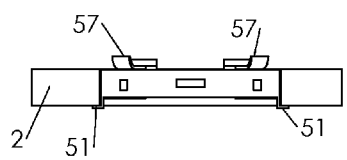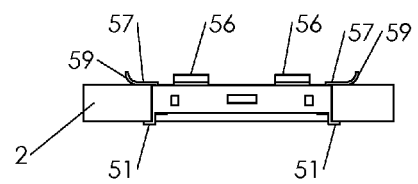
FIG. 20c
FIG. 20e
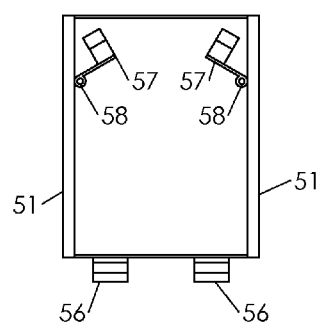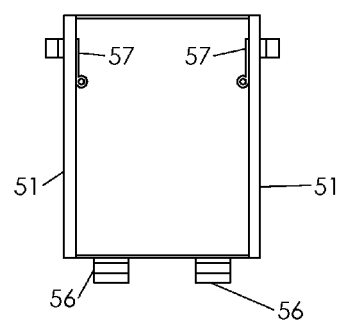
FIG. 20d
FIG. 20f

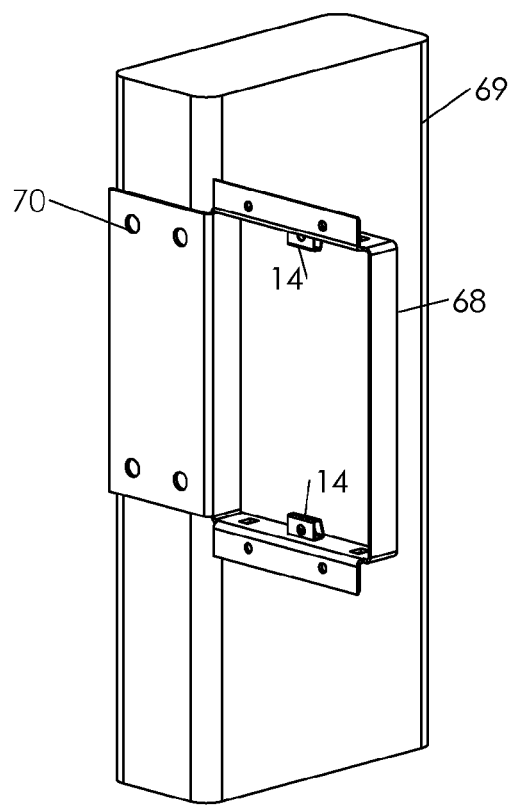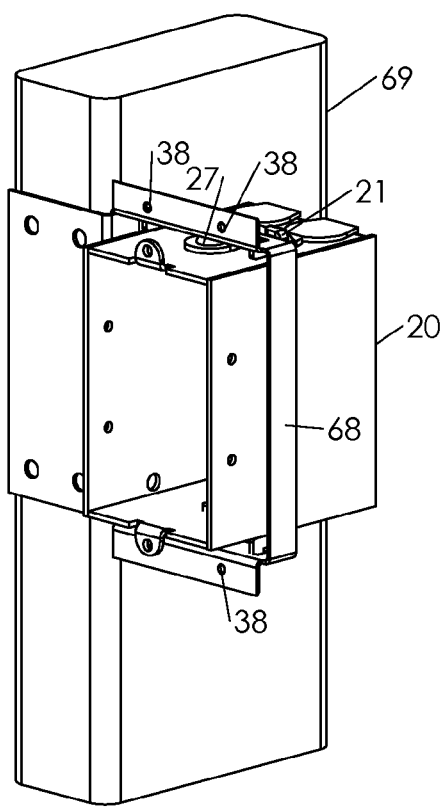
FIG. 25a  FIG. 25b
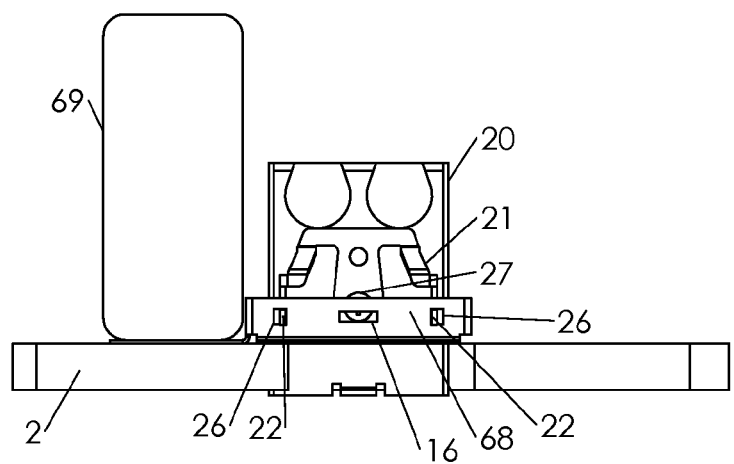
FIG. 25c

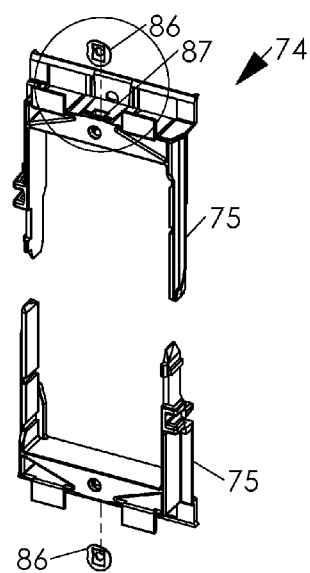
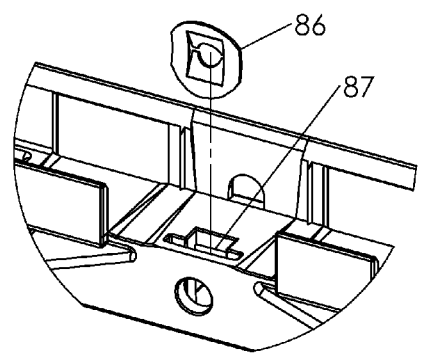
FIG. 27k
FIG. 27l
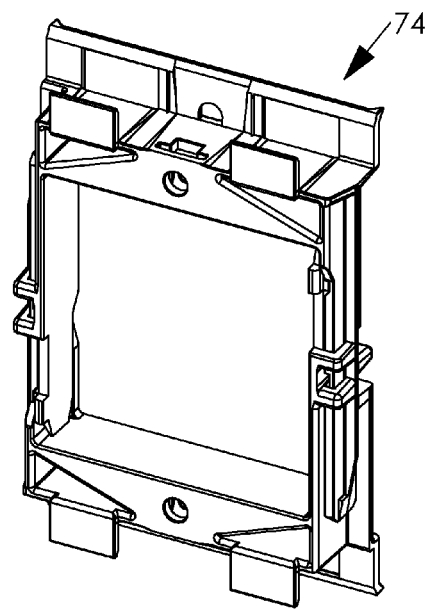
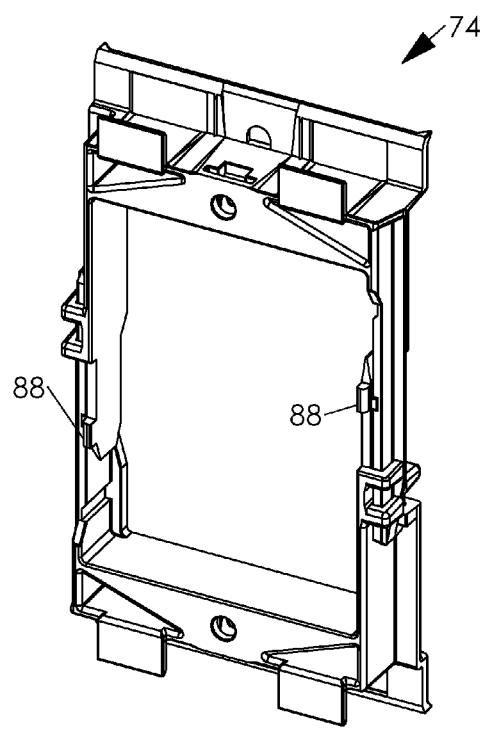
FIG. 27m
FIG. 27n

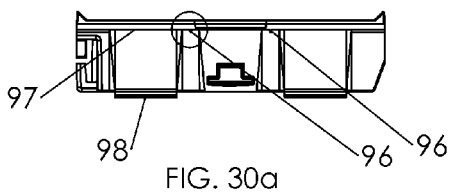
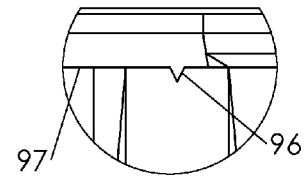
FIG. 30a
FIG. 30b
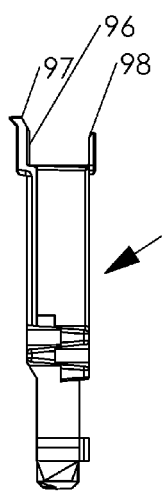
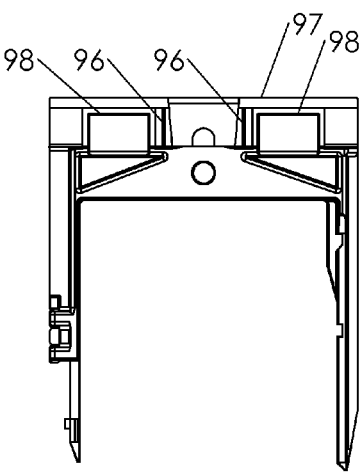
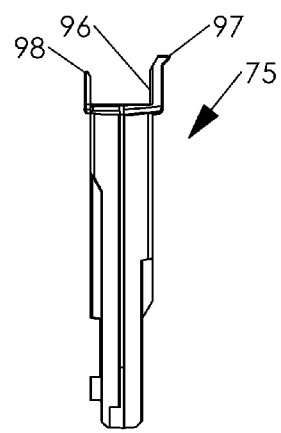
FIG. 30c
FIG. 30d
FIG. 30e
FIG. 30f
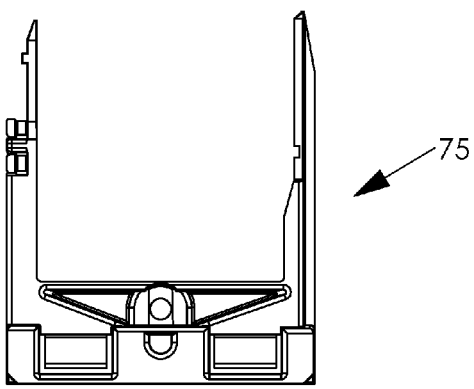
FIG. 30g

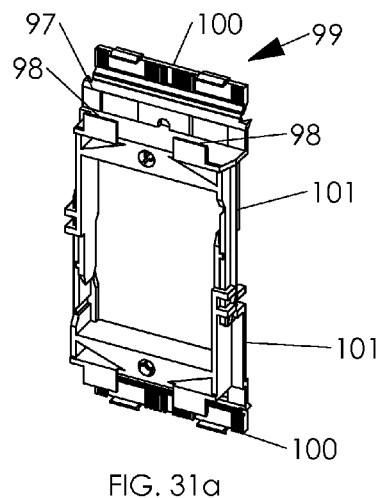
FIG. 31a
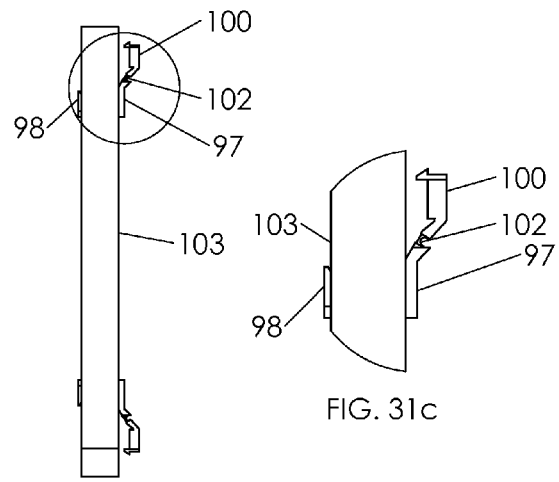
FIG. 31b
FIG. 31c
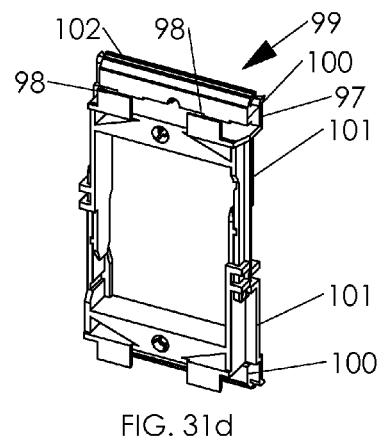
FIG. 31d
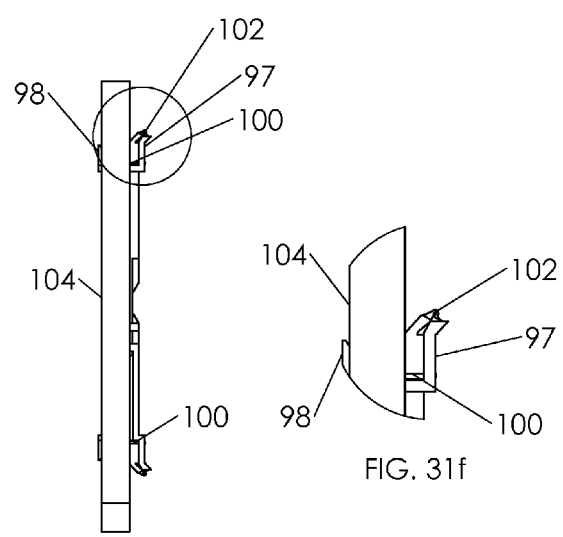
FIG. 31e
FIG. 31f

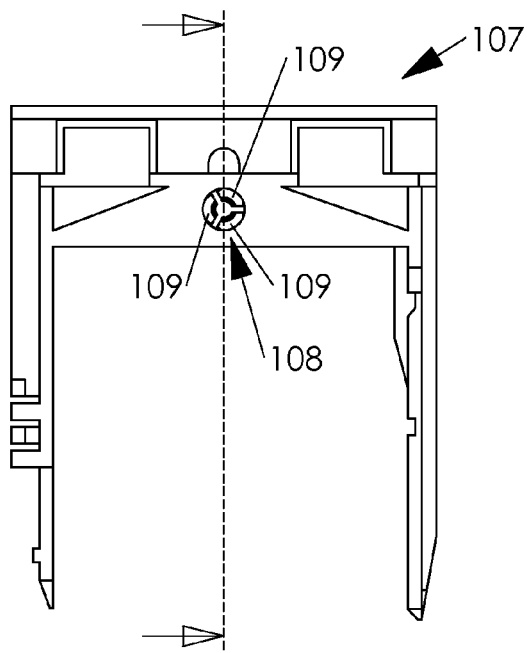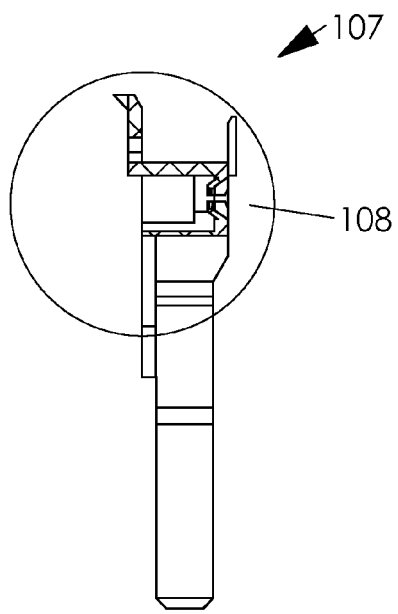
FIG. 32a
FIG. 32b
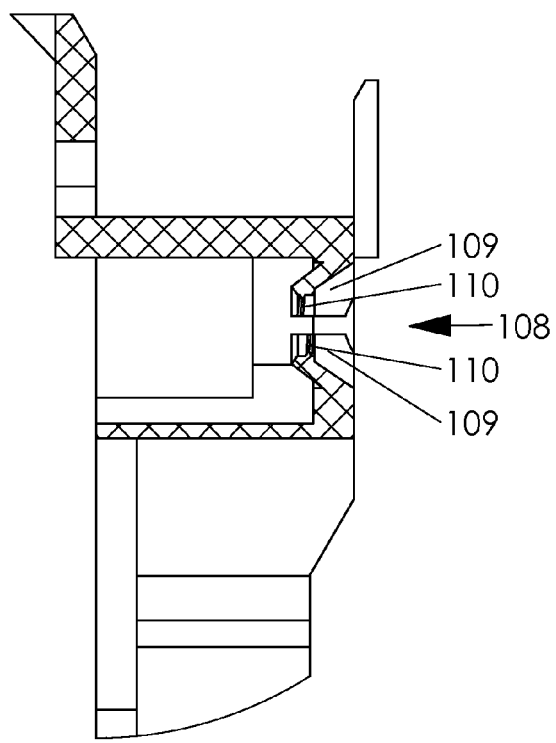
FIG. 32c

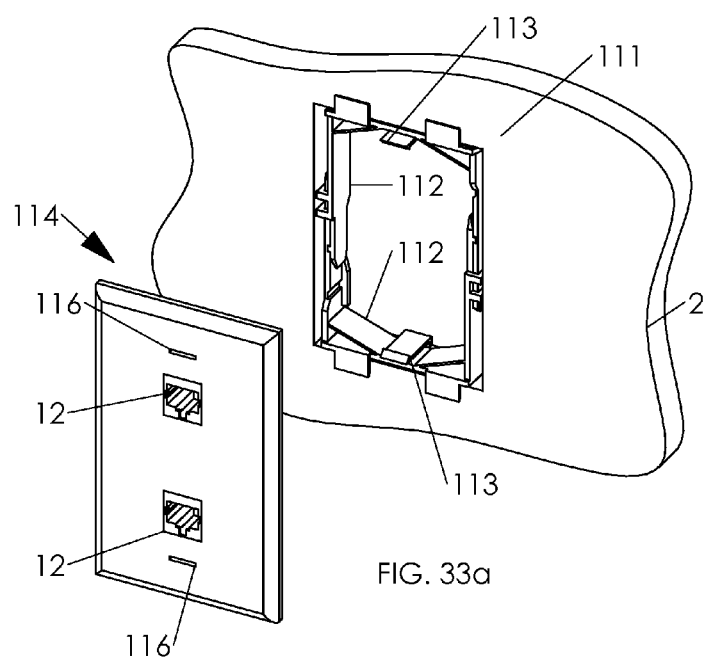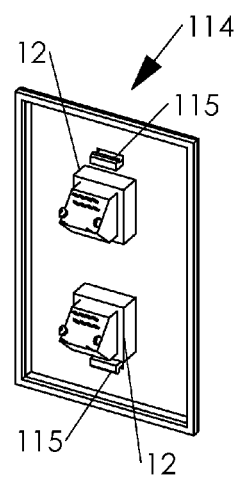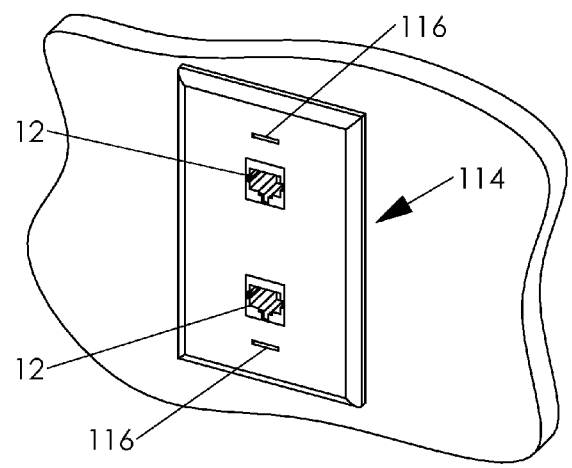
FIG. 33a
FIG. 33b
FIG. 33c

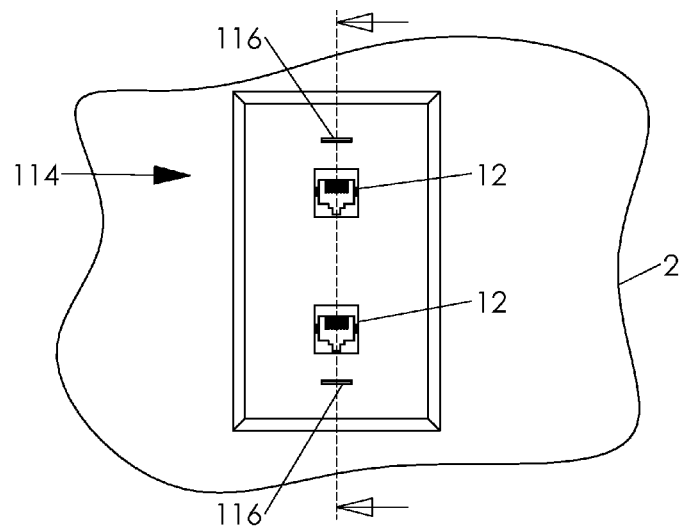
FIG. 33d
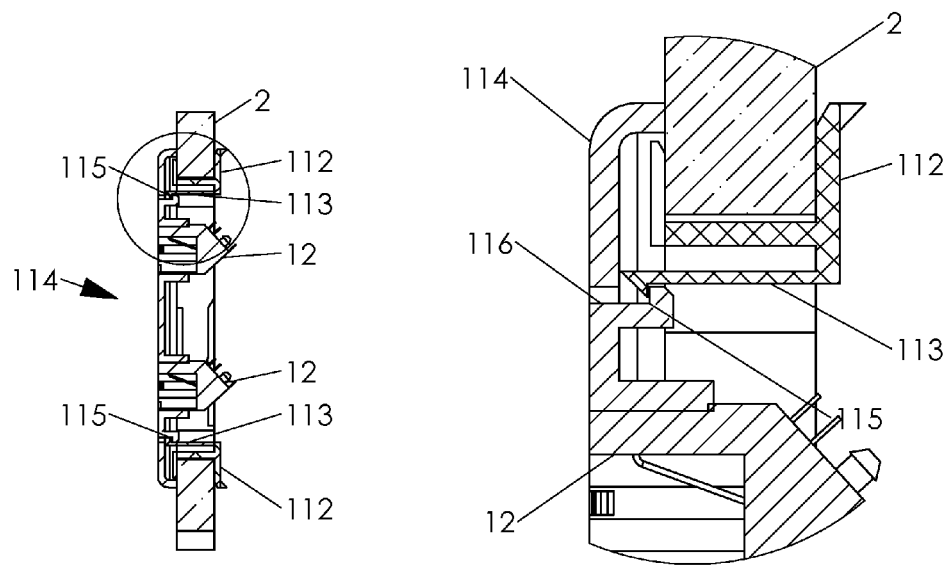
FIG. 33e                    FIG. 33f

WALL MOUNTING APPARATUS AND FRAME ASSEMBLY

This is a continuation-in-part of application Ser. No. 13/101,758, filed May 5, 2011 on behalf of inventors Guy Gagne and James Rogers. The benefit of provisional application 61/550,085, filed Oct. 21, 2011 on behalf of Guy and James Rogers, is claimed under 35 U.S.C. 119(e).

BACKGROUND

This disclosure is related to installation of electrical components in building structures, more particularly, to installation of electrical boxes, low voltage devices and the like in existing building walls.

Electrical switches and receptacles require electrical boxes to meet existing electrical codes. In new house or building construction, boxes typically are attached to wall studs or joists before drywall or equivalent sheet material is applied to enclose the wall space. Openings can be cut in the sheet material to accommodate the boxes to be mounted in known positions.

For retrofitting applications that require addition of electrical or low voltage device access to pre-existing building walls at new locations, a certain experience and skill set is required for installation. A new opening must be made in the existing wall substrate. The electrical box or low voltage device must be securely attached to the wall substrate as there is no readily available opportunity to mount the box to a closed wall stud. Attachment of the box to the wall substrate is labor intensive.

A need thus exists for a device that can adequately support an electrical box or low voltage device at a new location of an existing wall substrate. Such device should facilitate installation, both in speed and ease of installation.

SUMMARY OF DISCLOSURE

The needs described above are fulfilled, at least in part, by use of a self-supporting apparatus that can be placed in a pre-set opening in an existing wall substrate. A frame is configured with a perimeter edge that corresponds to the thickness of the wall substrate. The edge of the frame thus can be in fitting contact with the substrate opening. Flanges on opposite sides of the frame extend in the planar direction of the wall substrate to be in contact with the inner and outer surfaces of the substrate to maintain the frame in position in the wall and to strengthen the structure. The frame can include appropriate mounting portions for mounting electrical boxes or low voltage device within the wall.

Various flange arrangements may be utilized. For example, the flanges may be integral with the frame and project therefrom for contact with inner and outer wall surfaces. In another example, a flange may be comprised of a leaf spring that is biased for contact with the inner wall surface. The spring may be held to clear the wall opening when the frame is inserted and then released thereafter. A coil spring may be used as a spring loaded retainer biased for contact with the inner wall surface.

In another example, a flange can be coupled with a pivot arm mounted to an inner surface of the frame. The flange may be positioned within the frame perimeter until the frame is inserted in the wall opening. Thereafter, the flange may be pivoted to an extended position to be in engagement with the inner wall surface. Alternatively, track channels mounted on opposite sides of the frame may each be engageable with a curved retainer portion which can be positioned to apply pressure to the inner wall surface.

In another example, flanges can project from frame members that can be slid along sides of the frame. Prior to insertion of the frame in the opening, the slidable members can be positioned so that the flanges are located within the frame perimeter. After insertion, the slidable frame members can be moved to positions along the frame in which the flanges extend beyond the frame perimeter. The projected flanges can be retained in the extended positions by a detent arrangement or equivalent.

The frame may be sized to accommodate one or more electrical boxes. Mounting tabs integral with the frame may be configured to receive fasteners, for example threaded fasteners, for engagement with one or more electrical boxes. Weakened areas in tabs may be provided to facilitate separation from the frame of any tabs that are not required. Alternatively, the frame may contain apertures for mounting engagement with spring clips fixed to one or more electrical boxes. In another alternative, tabs inserted in slots in the top and bottom edges of the frame extend within the perimeter of the frame for connection with the electrical component. The tabs may comprise flexible material that is compressible for insertion into and removal from the slots. After insertion the tabs expand for capturing the tabs in the inserted positions.

The frame may additionally contain one or more protruding elements for contact with one or more electrical boxes. The protruding elements serve to appropriately position the boxes within the wall. The protruding elements and the frame may comprise electrically conductive material, the frame thereby being grounded to the electrical boxes.

The frame may be expandable to provide a wedge fit with the wall opening or may be adjustable to provide tight tolerance with the opening. An expandable frame embodiment includes first and second channel and tongue side elements in nesting relationship. Before insertion in the wall opening the side elements can be nested in a position in which the frame is longitudinally contracted so that flanges attached to upper and/or lower edges of the frame are within a contour of the wall opening. Upon insertion of the frame in the wall opening, the frame members can be expanded to fit the frame perimeter with the opening contour, the flanges then extending beyond the frame perimeter for contact with the wall surface. To maintain this frame configuration, the side elements can be provided with holes for engagement with detents on opposite sides.

In an alternative arrangement, the frame may comprise an interlocking hinge structure on opposite sides. Inward pressure on the sides of the frame with consequent inward bending of the sides will cause the height of the frame to contract. The frame will then have sufficient clearance for easy insert in the wall opening. Upon release of the bending pressure, the height of the frame returns to its heightened state for a tight fit with the wall opening contour. In lieu of a hinged structure, the frame may be comprised of an elastomeric material for reducing the frame dimension when compressed and returning the frame to its normal position by when expanded.

An installer thus is not restricted to a specific location or size of opening to be placed in an existing building wall for providing electrical or low voltage device access. An opening of desired size and location can be created. A frame can be provided with a perimeter sized for contact with the created wall opening. Various mounting arrangements can be provided for attaching electrical boxes or low voltage devices are contemplated.

Insertion of the frame in the wall opening so that flanges of the frame extend in contact with both sides of the wall substrate can be accomplished in several ways.

Use of frame formed of elements in slidable nesting relationship with each other permit adjustment of the frame dimension in a planar direction. Prior to insertion, the elements can be set to a nested position in which extend frame flanges are within the wall opening contour. The frame in this nested position can then be inserted in coplanar relationship in the wall opening. The slidable elements can then be extended from their nesting position to an extended position in which the frame perimeter is in tight contact with the wall opening periphery and the flanges extend in the planar direction outwardly from the wall opening. The frame elements can then be locked in the extended position. Electrical or low voltage devices can then be inserted into the wall opening through the frame and mounted thereto.

Frames may be formed of integral material with perimeters corresponding in dimension with the wall opening. With elastomeric flanges extending from only one side of the frame, the frame can be inserted by placing that side in contact with the corresponding wall opening portion, the flanges extending on inner surfaces of the wall. The frame can then be wedged into the opening by pivoting the frame about the side already in contact with the wall opening. Retainers can then be adjusted to maintain and strengthen the frame installation.

A frame may comprise a bracket assembly having opposing frame portions movable in opposite directions with respect to each other. The bracket assembly is expandable for contact with an opening in an existing building wall. Each frame portion comprises first and second sides joined by a cross member generally perpendicular thereto. The first side contains a detent on an outer surface thereof while the second side contains at least one groove on an inner surface thereof. The outer and inner surfaces of the opposing frame portions face each other and the detents and grooves are dimensioned to provide engagement, respectively, between detents and grooves of facing frame portion surfaces.

A groove in each frame portion may be located to define a passively biased resting position when engaged with a detent in the opposed frame portion. The bracket assembly then assumes a compressed bracket assembly state. The groove may terminate in a ramp configuration to facilitate disengagement of the detent when the assembly is to be expanded for mounting in the wall opening. A second groove in each frame portion is located distally from the first groove for locking engagement with the detent to define an expanded bracket assembly state. The perimeter of the engaged frame portions in the expanded state conform to the wall opening perimeter. An outwardly extending tab in the vicinity of each detent facilitates unlocking engagement of the detent from the second groove to release the assembly from its expanded state. Manual pressure on the tabs of each frame portion in a direction toward one another can free the engagement.

Inadvertent detachment of the frame portions beyond the expanded state of the bracket assembly may be avoided by provision of a tooth portion extending from the inner surface of the first side of each frame portion and a barb extending from the outer surface of the second side of each frame portion. Further expansion of the assembly is curtailed by abutment between the barbs and tooth portions.

At least one flange extends from a surface of the cross member for contact with the wall surface when the assembly is mounted within the opening. A plurality of flanges, spaced from each other in a direction of the thickness of the wall, may extend from each of the frame portion cross members for contact with the outer and inner surfaces, respectively, of the building wall. Spikes may face outwardly from a flange surface near corners. Temporary contact of the spikes with a wall surface can determine the periphery of the wall opening to be formed. Such contact can be made with the bracket assembly in its compressed state. An inwardly protruding rib can be formed on a flange to provide lateral stability of the assembly in the wall.

The opposing frame portions and flanges may be formed of plastic material, such as with an injection molded process. The first side of each frame portion is relatively flexible with respect to rigidity of the second side. The groove may extend within the second side to an extent less than the entire thickness dimension of the second side. A spring nut may be integrally molded in a flange or frame member for mounting an electrical device. A flange of each frame portion may be formed with a hinged spacer element configured to be folded inwardly for use with a wall thickness that is less than the spacing between the flanges of a cross member. The spacer element may contain a barbed portion configured to be latched with the frame element. The spacer element can be detachable from the flange if the wall thickness is commensurate with the spacing between the flanges. The assembly may be configured for snapping an electrical component faceplate thereto.

BRIEF DESCRIPTION OF DRAWINGS

Various exemplary embodiments are illustrated by way of example, and not by way of limitation, in the figures of the accompanying drawings in which like reference numerals refer to similar elements and in which:

FIG. 1 is a perspective view of a preferred embodiment of a frame assembly installed in an opening in a partially cut away wall;

FIG. 2 is a perspective view of one frame element of the embodiment of FIG. 1;

FIG. 3 is an elevation view of the frame element shown in FIG. 2;

FIGS. 20a-20f exemplify another alternative frame assembly arrangement;

FIGS. 25a-25c exemplify an embodiment for a stud mounted frame for mounting of low voltage devices and electrical boxes;

FIG. 27k is an exploded view of the low voltage frame assembly shown in FIGS. 27a-j;

FIG. 27l is a detail view taken from FIG. 27k;

FIG. 27m is a perspective view of the compressed low voltage bracket;

FIG. 27n is a perspective view of the expanded low voltage frame assembly;

FIG. 29b is a view of the completed installation of the exploded assembly shown in FIG. 29a;

FIGS. 30a and 30c-g are orthographic views of the half frame shown in the embodiment in FIGS. 27-29;

FIG. 30b is a detail plan view taken from FIG. 30a;

FIG. 31a is a perspective view of an alternate embodiment of the frame assembly in the expanded state;

FIG. 31b is a side view of the assembly in FIG. 31a installed in a hole in thicker substrate;

FIG. 31c is a detail view taken from FIG. 31b;

FIG. 31d is a perspective view of the embodiment shown in FIG. 31a with a spacer in place;

FIG. 31e is a side view of the assembly in FIG. 31d installed in a narrower hole;

FIG. 32b is a section view taken from FIG. 32a;

FIG. 32c is a detail view taken from FIG. 32b;

FIG. 33a is a perspective view of a frame and device cover plate;

FIG. 33b is a rear perspective view of the device cover plate assembly shown in FIG. 33a;

FIG. 31f is a detail view taken from FIG. 31e;

FIG. 32a is a front view of a half frame with a molded spring nut;

FIG. 33c is a perspective view of the installed assembly;

FIG. 33d is a front view of the installed assembly shown in FIG. 33c;

FIG. 33e is section view taken from FIG. 33d;

FIG. 33f is a detail view taken from FIG. 33e;

FIG. 34b is a perspective view of the installed assembly taken from

FIG. 34g is a perspective view of the frame assembly depicted in FIG. 34a;

FIG. 34m is a back perspective view of the device cover plate assembly shown in FIG. 34a;

DETAILED DISCLOSURE

Figure 4:
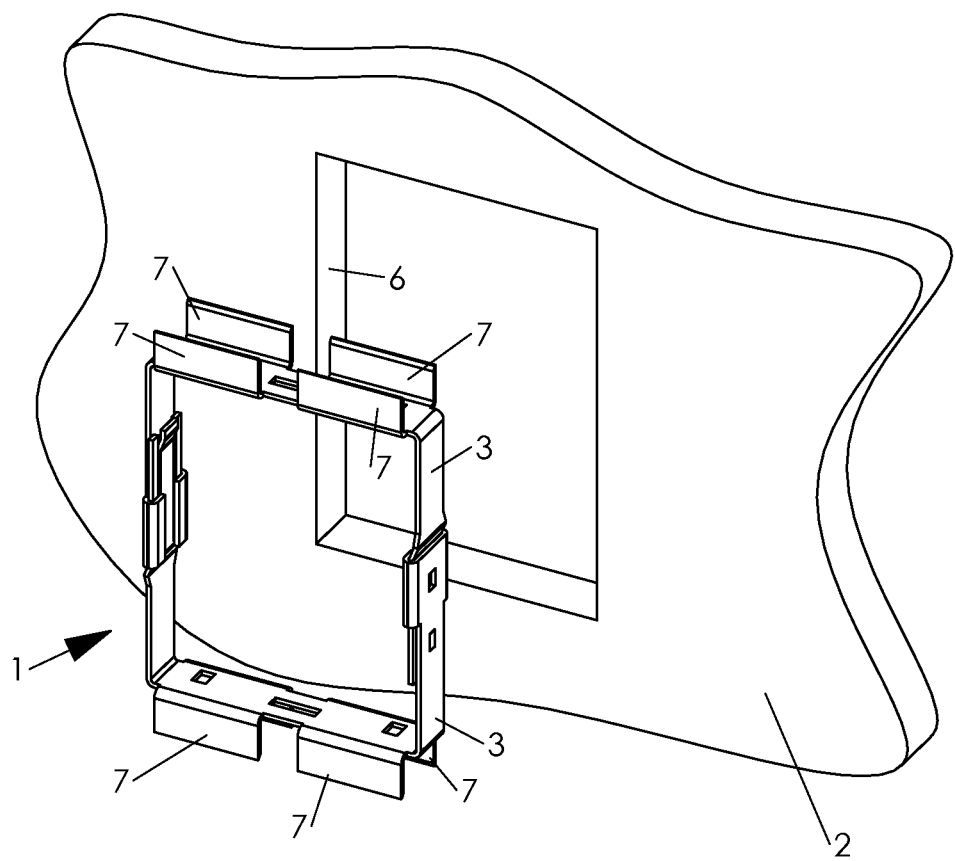
FIG. 4 is a perspective view of the embodiment of the frame assembly of FIG. 1, shown in a compressed state prior to installation in the opening in the wall.

In FIG. 1, frame assembly 1 is shown mounted in a cut away sheet of drywall 2. The drywall opening can be prepared with a drywall saw. The frame assembly comprises two frame elements 3 that together can be adjusted to define a perimeter that fits the contour of the drywall opening. The depth of the frame corresponds to the depth of the drywall.

Both frame elements may be identical, as represented more particularly be a frame element perspective view in FIG. 2 and an elevation view in FIG. 3. For clarity of illustration, only the upper frame element 3 of FIG. 1 is shown. Frame element 3, of U-shaped configuration, can be stamped and formed out of metal, for example, galvanized sheet metal. Of course, any other suitable material can be used to form the frame elements. Flanges 7 extend upwardly from the top edges of frame element 3. The frame element sides are of unequal length. The shorter side terminates in a track channel 5. Aperture 10 is formed in the side of the frame element proximate the track channel 5. The longer side terminates in a cantilever 9, having raised tongues 4 thereon. A detent 8 is positioned between tongues 4 near the bottom of cantilever 9 on its outer side. Holes 16 and 26 on the top of the frame element permit fixing an electrical component to the frame element. The bottom frame element 3 shown in FIG. 1 is of similar configuration, its flanges extending downwardly.

The frame assembly shown in FIG. 4 is in a compressed form prior to insertion into the opening 6 in the drywall. The tongues 4 of each frame element 3 are inserted into the tracks 5 of the other. Once positioned in the opening, the two frame elements 3 are slid apart wedging opposing flanges 7 on the drywall 2 on the top and bottom of the opening. When the frame elements 3 are fully expanded, detent 8 on the cantilever 9 snaps into the aperture 10 on the opposing part, locking the frame assembly in place. The flanges 7 are spaced apart an amount that depends on the thickness of the drywall. Upper and lower flanges 7 on both frame elements serve to maintain the position of the frame within the wall opening as well as to wedge the wall within the flanges.

Figure 5:
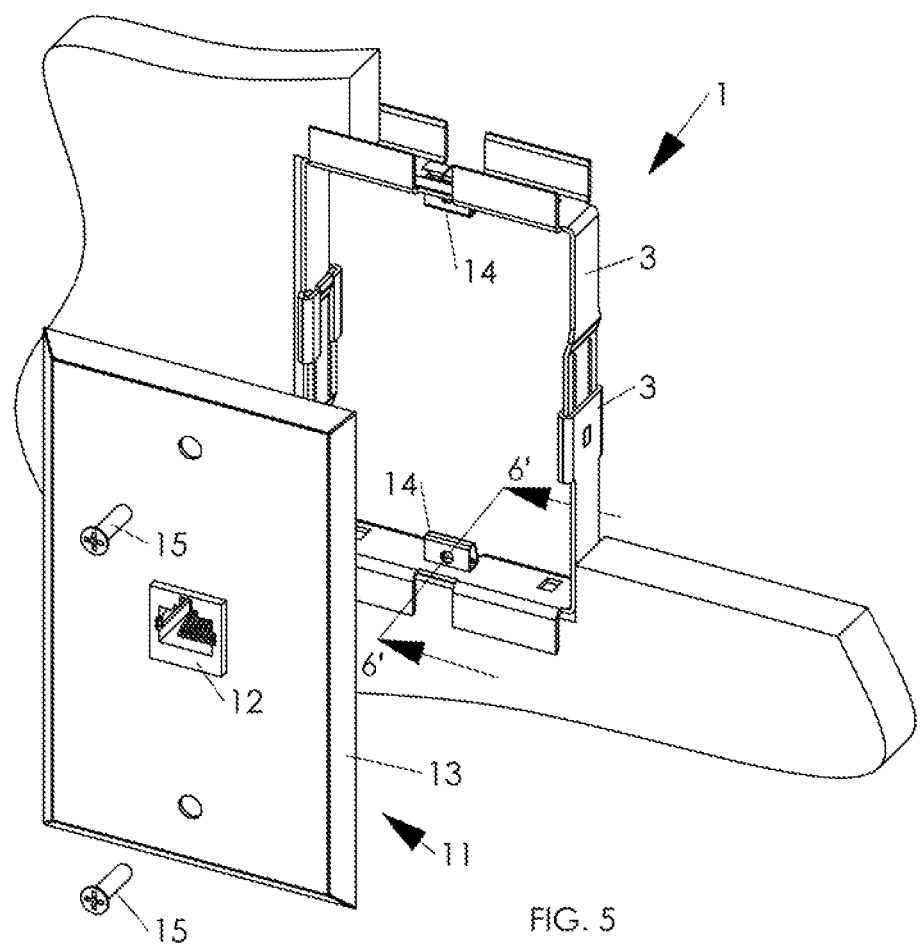
FIG. 5 is a perspective exploded view of a preferred embodiment of the frame assembly serving as a mounting bracket for a telecom connector.

FIG. 5 exemplifies use of the frame assembly 1 as a mounting bracket for a low voltage connector 11. Mounting tabs 14 have been inserted into slots 16 on the top and bottom of the frame assembly. The mounting tabs 14 may comprise, for example, a sheet metal material. A jack female connector 12 is shown snapped into a wall plate 13. A cable connection to the jack 12 is made prior to insertion into the wall plate 13. Although illustrated as a female connector, jack 12 is representative of any low voltage device.

Figure 6:
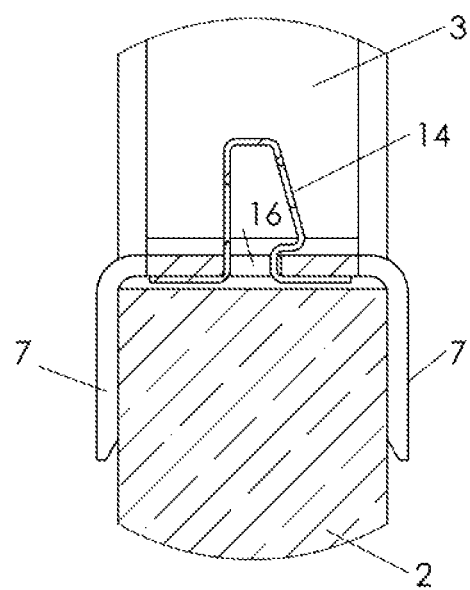
FIG. 6 is a detail section view of a portion of FIG. 5.
Figure 7A:
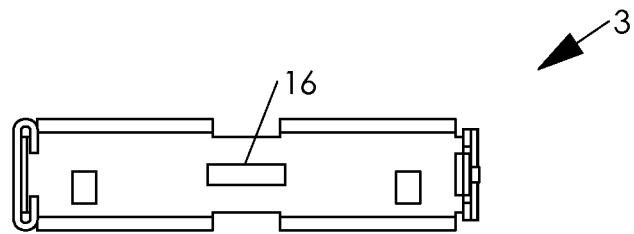
FIG. 7a is a plan view of a frame element of the embodiment of FIG. 5.
Figure 7B:
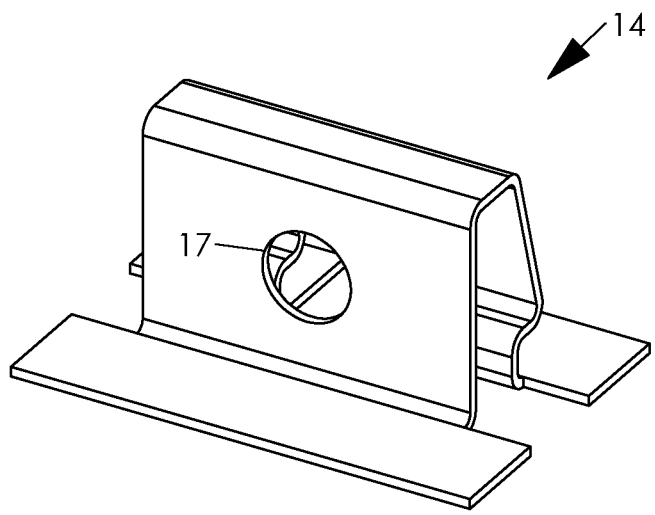
FIG. 7b is a perspective view of a tab coupled to the frame shown in FIG. 5.

FIG. 6 is a section view, along 6'-6' in FIG. 5, of mounting tab 14 installed in frame element 3. FIG. 7a is a plan view of frame element 3. Slot 16 in the frame element 3 is configured to receive mounting tab 14, as can be seen in FIG. 6. The configuration of mounting tab 14 is shown in more detail in the perspective view of FIG. 7b. The flexibility of the sheet metal or like material allows the tab 14 to compress as it is pushed into the slot 16 and once at the appropriate depth it expands and remains captive. Removal of the tab 14 from the slot 16 is possible by compression of the tab with fingers or pliers.

When the frame is installed in the wall opening, as shown in FIG. 6, the base of tab 14 is positioned between the frame element 3 and the wall 2. The mounting portion of tab 14 protrudes within the perimeter of the frame. The wall plate 13, as can be seen in FIG. 5, can be mounted on the frame assembly 1 via two tabs 14 with holes 17 that receive appropriately sized threaded fasteners 15.

Figure 8:
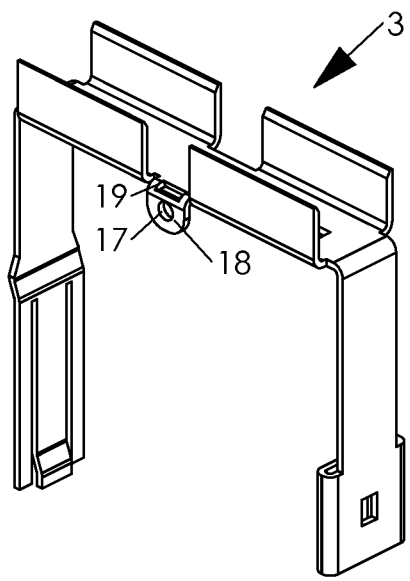
FIG. 8 is a perspective view of a break-away tab integral to a frame such as shown in FIG. 1.

An alternative arrangement for mounting a low voltage device to frame element 3 is illustrated in the perspective view of FIG. 8. Tab 18 is integral to the frame element 3 via a weakened area 19. Hole 17 is provided for receiving an appropriately sized fastener. The tab 18 can be removed when it is not needed, for example, when the frame is to be used for installation of an electrical box. The weakened area 19 material facilitates removal of the tab.

Figure 9:
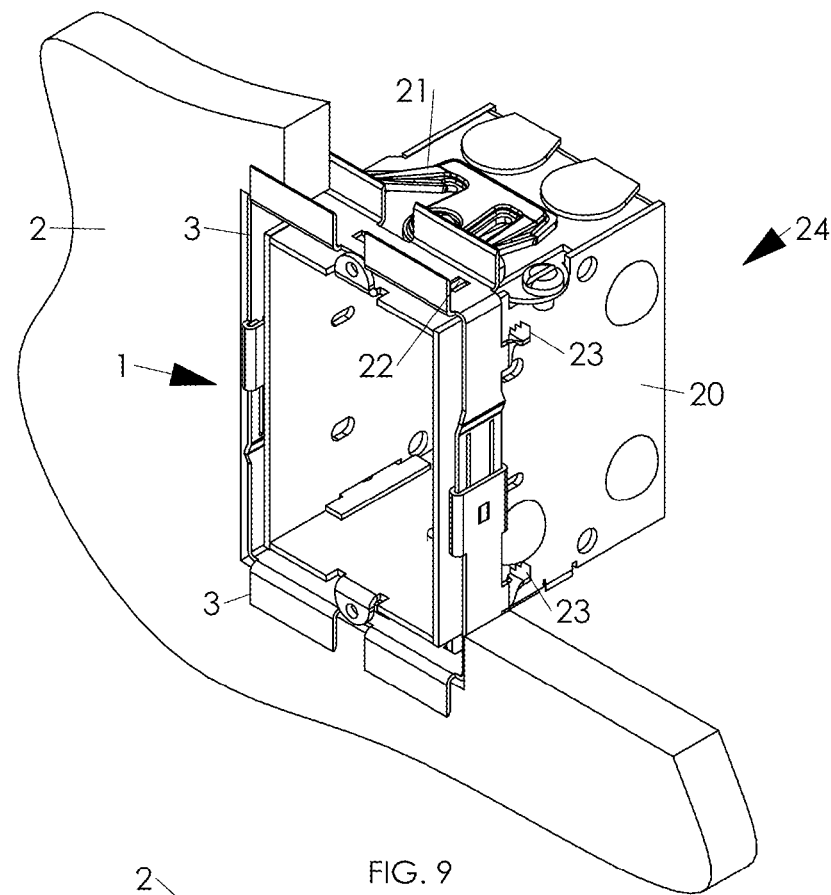
FIG. 9 is a perspective view of a frame assembly coupled with an electrical box.

FIG. 9 exemplifies use of frame assembly 1 for mounting an electrical box assembly 24. The frame assembly 1 has been expanded and locked to fit into the opening in the drywall 2 as described above with respect to FIGS. 1-4. Upper and lower frame elements 3 include holes 26 in their top and bottom sides, respectively. The sides of upper and lower frame elements 3 have formed thereon barbed elements 23 that extend in a direction inward of the wall opening. Assembly 24 comprises electrical box 20 and spring clip 21. Spring clip 21, integral with electrical box 20, is shown in more detail in an exploded view in FIG. 12. As shown, spring clip 21 can be fixed to the electrical box 20 by screw 27. Arms of spring clip 21 terminate in teeth 22. As an alternative to a threaded hole in box 20 for receiving screw 27, the clip can be formed as an integrated portion of the top and bottom surfaces of the electrical box. In either alternative, spring clip 21 is integral with electrical box 20 prior to its mounting in frame assembly 1.

Figure 10:
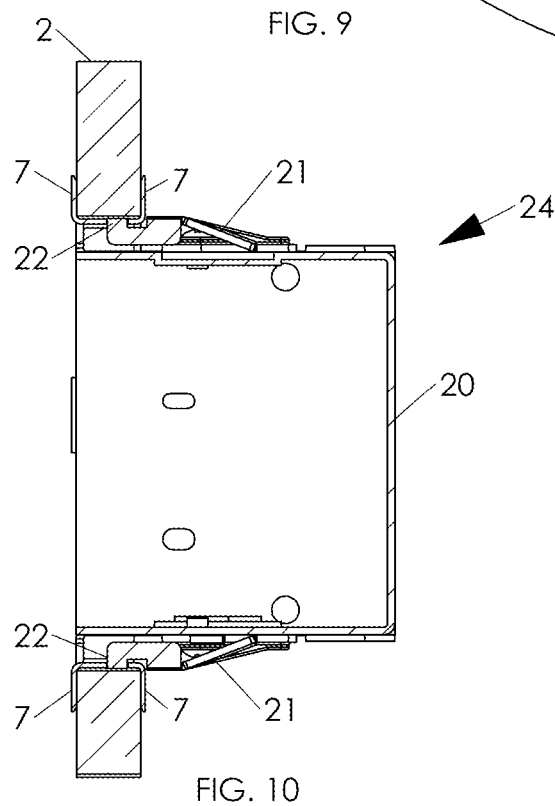
FIG. 10 is a section view of the assembly shown in FIG. 9.
Figure 11:
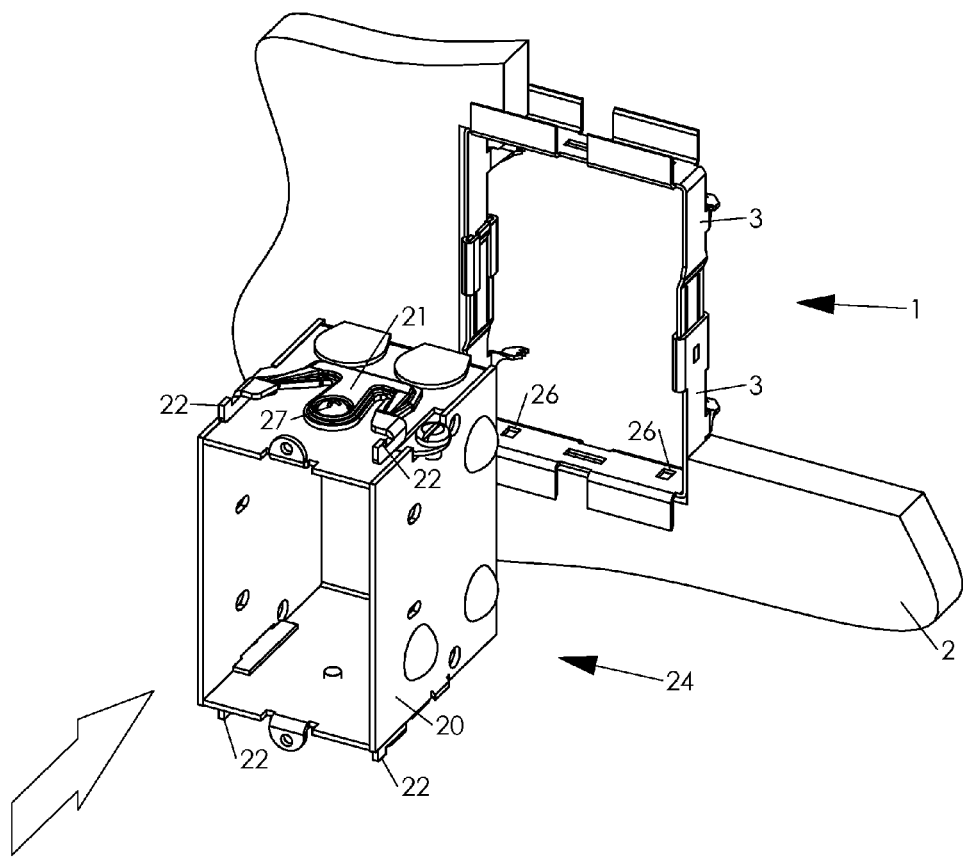
FIG. 11 is an exploded view of the assembly shown in FIG. 9.
Figure 12:
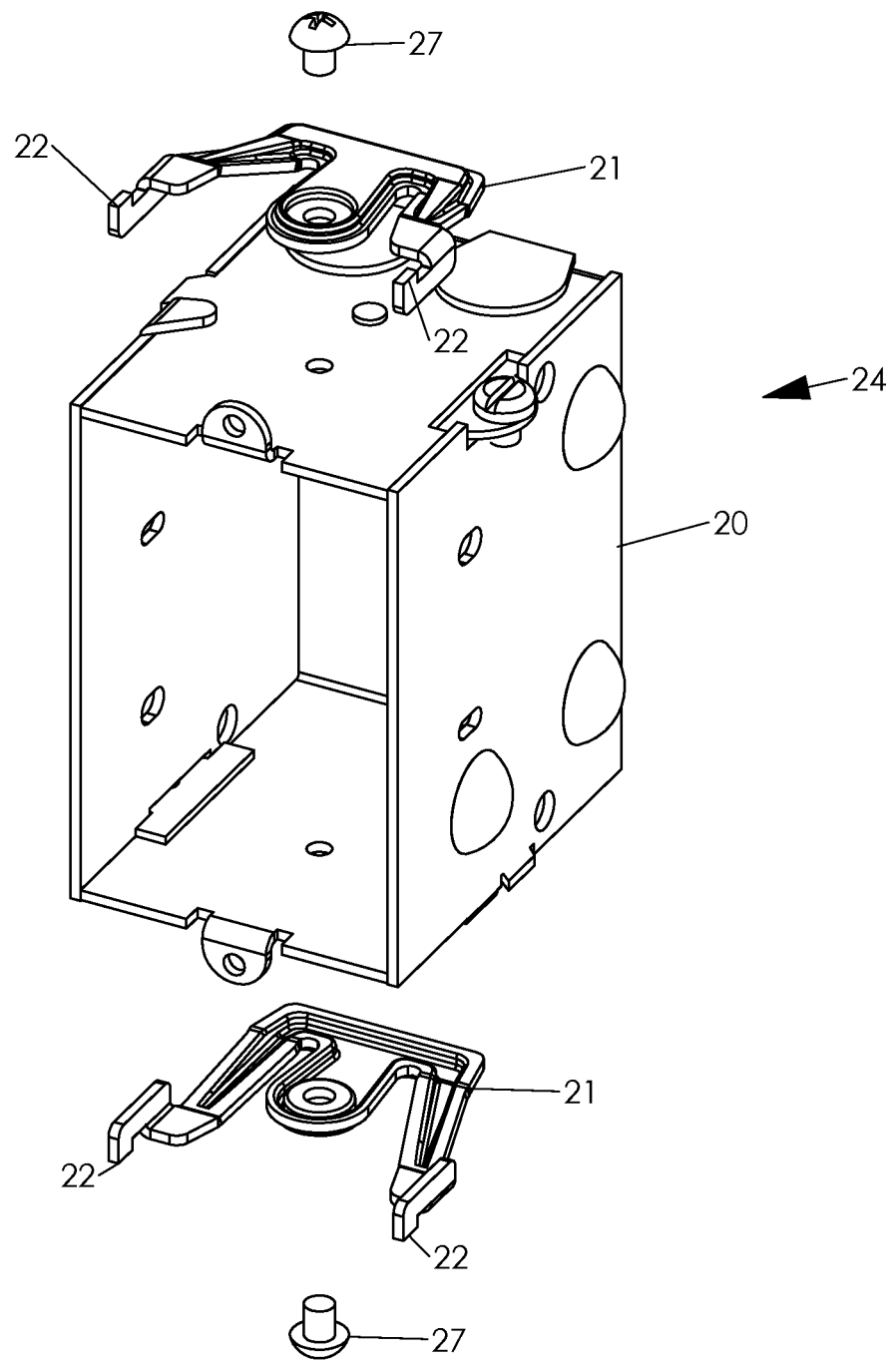
FIG. 12 is an exploded view of the electrical box assembly shown in FIG. 9.

As the electrical box assembly 24 is inserted into the frame assembly 1, the sprung clips 21 are compressed toward the box 20. In the illustration of FIG. 12, spring clip 21 on the upper surface of box 20 is compressed downwardly and the spring clip on the lower surface of box 20 is compressed upwardly. Once the box assembly 24 has been inserted sufficiently, as shown in FIG. 9, the clips 21 are then free to spring up and allow teeth 22 to fit into holes 26 located on either side of the top and bottom of the frame assembly 1, fixing the box into position. While holes 26 are shown as being rectangular shaped, other shapes can be used. As the box assembly 24 is inserted, barbed elements 23, integral to the frame, apply pressure on the wall of the box 20, electrically grounding the frame when the box is grounded with a wire. The barbed elements 23 can also provide centering when electrical boxes are used in a frame assembly. FIG. 10 is a side view showing electrical box 20 inserted into the frame assembly 1 and the opening of wall 2. The box 20 is now ready for installation of an electrical devise and wall plate.

Figure 13:
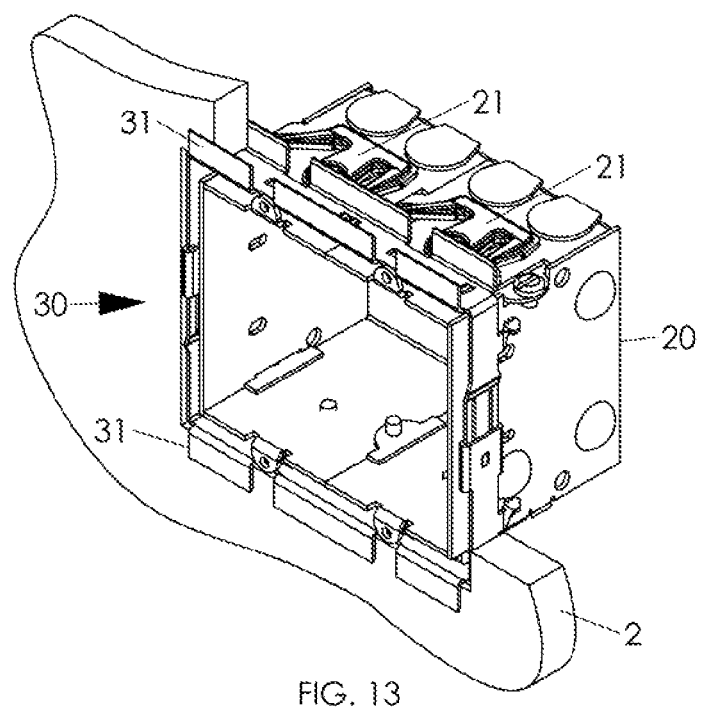
FIG. 13 is a perspective view of a frame assembly coupled with a two gang electrical box.
Figure 14:
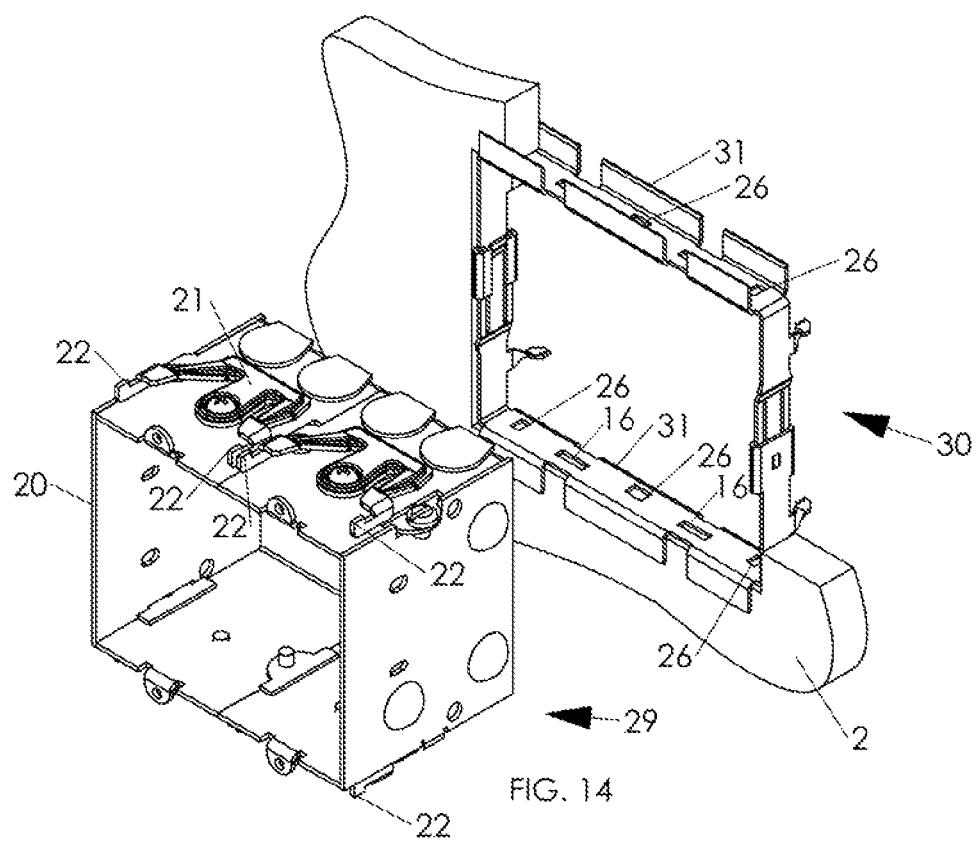
FIG. 14 is an exploded view of the embodiment shown in FIG. 13.

Frame assembly 1 can be configured to accommodate a ganged electrical box to be mounted in an appropriately sized wall opening, as illustrated in the perspective view of FIG. 13 and exploded view of FIG. 14. A two gang electrical box assembly 29 is mounted in a wider frame assembly 30. The wider frame elements 31 may be formed with additional flanges as appropriate for positioning the frame assembly in the wall opening and wedging the wall to the frame assembly. In a manner similar to the embodiment of FIGS. 9-12, teeth 22 of spring clips 21 mate with holes 26 in frame elements 31 when the ganged electrical box is inserted. As shown, for the two gang electrical box 20, twice the number of spring clips is provided for a corresponding number of holes 26 in the frame assembly. Although a two gang electrical box assembly is exemplified, the frame assembly can be sized to mount an electrical box having any number of ganged electrical components. Alternatively, the frame assembly can be sized to accommodate a combination of a single box and low voltage device, or ganged boxes and low voltage devices. When a low voltage device is used, the mounting tabs 14 of FIG. 5 would be inserted in respective slots 16.

Figure 15:
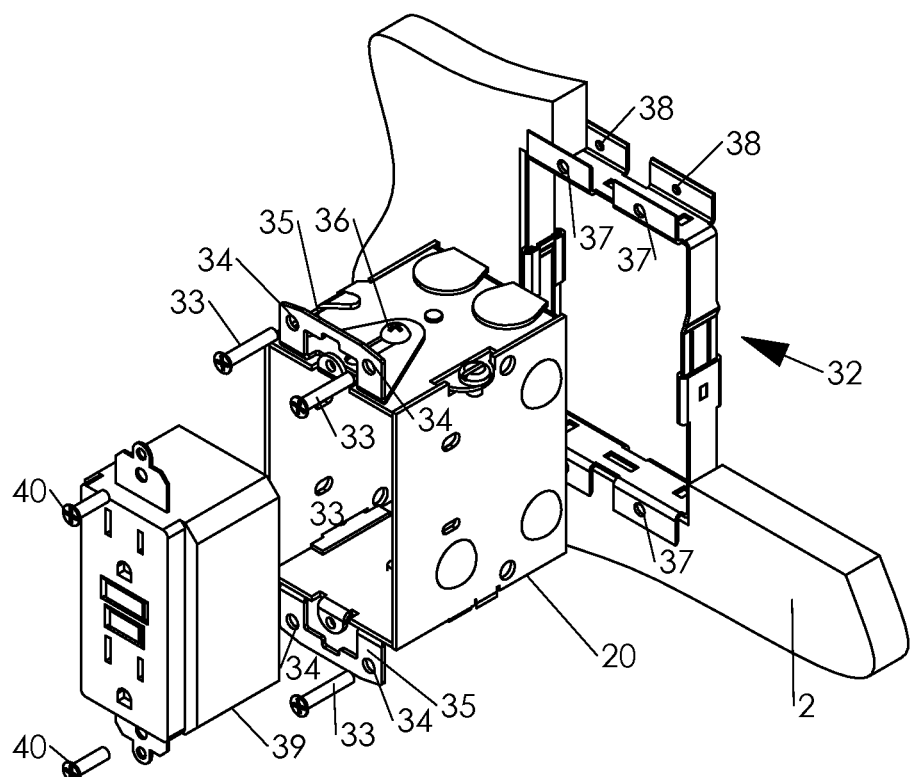
FIG. 15 is an exploded perspective view of an alternative embodiment of a frame assembly coupled with an electrical box.

FIG. 15 is an exploded perspective view of an alternative embodiment of the frame assembly of FIG. 9 wherein an electrical box 20 can be mounted to frame assembly 32 using threaded fasteners. Holes 37 and 38 are provided in the outer and inner frame assembly flanges. Holes 37 and 38 are in alignment for correspondence with holes 34 in ears 35 located on the top and bottom of the electrical box 20. Holes 38 are tapped for engagement with threaded fastener 33. Holes 37 are clearance holes for the fasteners 33. Clearance holes also are provided in wall substrate. The fastener length is sized for attachment of ears 35 of the box to the flange holes 38 through the wall substrate. An electrical outlet 39 is shown with threaded fasteners 40 which mount it to the electrical box 20. The box 20 can instead be used to house other electrical components, such as switches and the like.

Figure 16A:
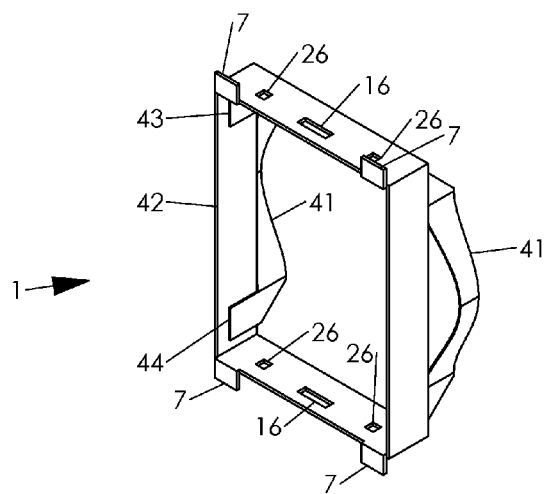
FIGS. 16a-16c exemplify an alternative frame assembly arrangement.
Figure 16B:
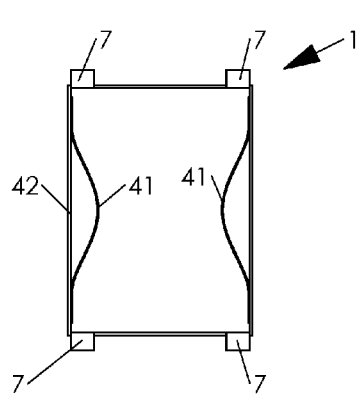
Figure 16C:
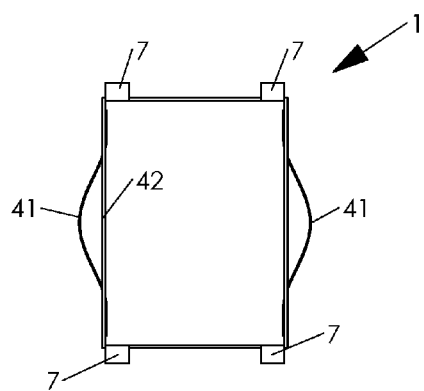

FIGS. 16a through FIG. 16c exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 7 are shown at the top and bottom of the outer wall side of the frame 42. Leaf spring elements 41 are attached to the inner sides of frame 42 at the top portion 43 and bottom portion 44, for example, by welding. These spring elements can be made of metal or any suitable material.

Each spring element 41 is longer than the frame 42 is high so that the spring element can flex inwardly toward the center of the frame 42 as seen in FIG. 16b or outwardly as seen in FIG. 16c. An external force, such as finger pressure, is required to move the element 41 from the inward position to the outward position and vice versa. Before insertion of the frame in the wall opening, spring elements 41 are biased to the inside of the frame as shown in FIG. 16b. In this configuration, the frame assembly 1 can be inserted in the opening in the wall with flanges 7 abutting the outer wall surface. Outward pressure can then be applied to the spring elements 41. Once biased to the outside, the middle portions of the spring elements overlap the backside of the wall and retain the frame in the opening.

Additional flanges may be located at the top and/or bottom of the inner wall side of the frame. Although not illustrated, any of the arrangements for mounting an electrical component mounting to the frame, as previously described above with respect to FIGS. 1-15, can be utilized with frame 42.

Figure 17A:
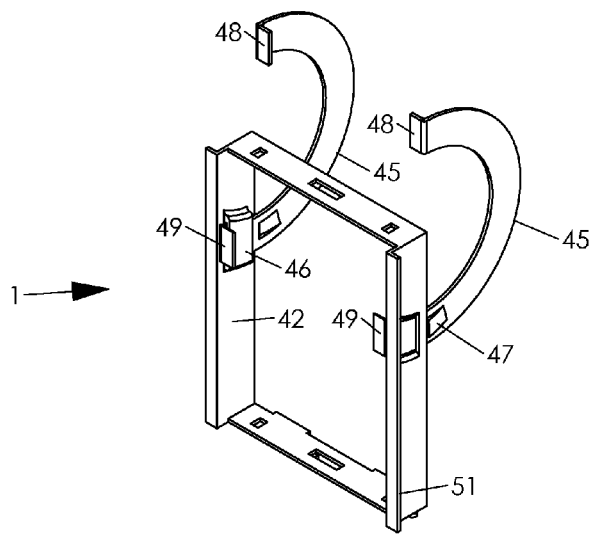
FIGS. 17a-17d exemplify another alternative frame assembly arrangement.

FIG. 17a is a perspective view of another alternative frame assembly 1 for mounting an electrical component in a wall opening. Frame 42 is a unitary structure dimensioned with a perimeter corresponding to the contour of a substrate wall opening such as shown in FIG. 4. Side views of FIGS. 17-17d are illustrative of positions of installation. As in the arrangement of FIG. 16a, Frame 42 is a unitary structure dimensioned with a perimeter corresponding to the contour of a substrate wall opening such as shown in FIG. 4. Flanges 50 extend from the bottom edge of frame 42 at the inner side of the wall substrate and have a curvature at the distal end to facilitate insertion of the frame 42 into the substrate wall opening. Flanges 51, along the side edges of the frame extend outward to overlap the outer side of the wall substrate. A channel track 46 is formed on each inner side of the frame 42. A curved retainer 45 is held within each channel track 46 and is slidable therein relative to the frame 42. Retainer 45 terminates at surface 49 at the outer wall side of channel track 46 and terminates at surface 48 at the inner wall side of channel track 46. A spring barb 47 is formed on the outer side of retainer 45 proximate surface 49. Retainer 45 may be comprised of sheet metal having a springable functionality that permits barb 48 to traverse the channel 46.

Figure 17B:
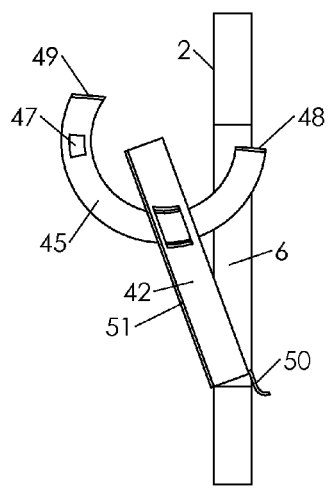

FIG. 17b is a side view of the frame assembly 42 as it is about to be inserted into the wall opening. Each curved retainer 45 is situated in the corresponding channel track 46 at a position intermediate the end surfaces 48 and 49. Upon insertion, the bottom side of the frame is positioned at an angle with the bottom side of the wall opening such that flanges 50 are in contact with the inner edge thereof. The frame is then rotated to the position shown in FIG. 17c until flanges 51 are in contact with the outer surface of the wall substrate. Flanges 50 and 51 sandwich the wall substrate. Pressure is then applied to surfaces 49 to slide the retainers in the track 46 until surfaces 48 apply pressure against the backside of the drywall 2 and the spring barbs 47 engage the back side of frame 42 and retain the frame assembly 1 in position as seen in FIG. 17d.

Figure 17C:
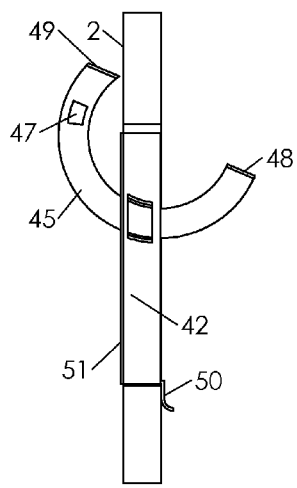
Figure 17D:
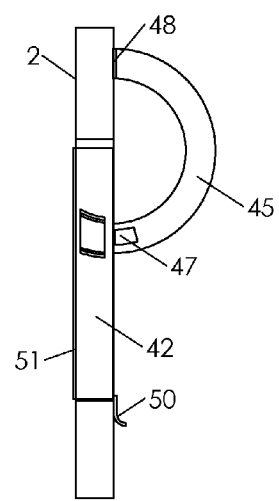
Figure 18A:
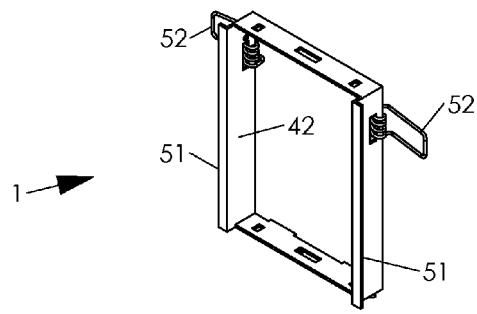
FIGS. 18a-18c exemplify another alternative frame assembly arrangement.
Figure 18B:
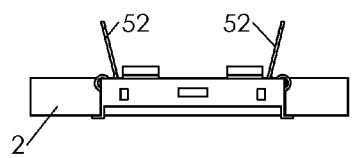
Figure 18C:
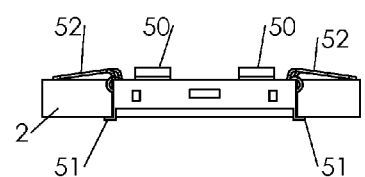

FIG. 18a through FIG. 18c exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 50 extend from the bottom edge of frame 42 at the inner side of the wall substrate. An outwardly biased coil spring arm 52 is captured near the top of each side of the frame as shown in the perspective view of FIG. 18a. In the manner described above with respect to the arrangement of FIG. 17, the frame is rotated into position in the wall opening at its bottom side, whereby opposing flanges 50 and 51 compress the wall substrate. The upper portion of the frame is inserted into the opening 6 by compressing the outwardly biased coil spring arms 52, a position shown in FIG. 18b. Once the front flange 51 is against the drywall the coil spring arms 52 are released to spring to the position shown in FIG. 18c. Coil spring arms 52 then apply pressure on the backside of the drywall 2 against the front flange 51 of the frame 42 to secure the frame in position.

Figure 19A:
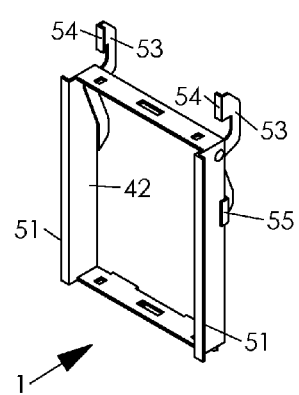
FIGS. 19a-19c exemplify another alternative frame assembly arrangement.
Figure 19B:
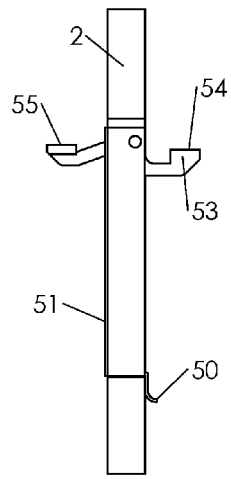
Figure 19C:
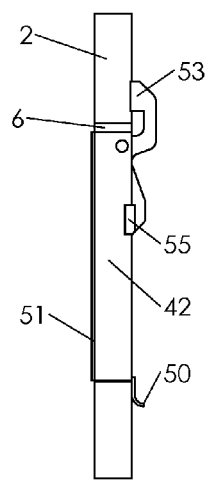

FIG. 19a through FIG. 19c exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 50 extend from the bottom edge of frame 42 at the inner side of the wall substrate. A retainer arm 53 is affixed about a pivot point in each side of frame 42, as shown in the perspective view of FIG. 19a. Retainer arm 53 terminates at opposite end surfaces 54 and 55. Retainer arm 53 may be comprised of sheet metal having a springable functionality.

In the manner describe above with respect to FIGS. 17a-17c, opposing flanges 50 and 51 compress the drywall 2 as frame 42 is rotated into position about the lower edge of the opening in the drywall 2. As shown in the side view of FIG. 19b, upon insertion of the frame in the wall opening 6, the arms 53 are relatively balance in a position generally perpendicular to the frame 42. Surface 55 projects outwardly from the wall while surface 54 projects inwardly. To retain the upper portion of frame 42 to the wall, the outwardly projecting ends of the arms 53 are rotated down into the frame. The opposite end 54 is thus rotated upwardly to apply pressure on the backside of the drywall 2, while applying a compression force to the wall against the front flange 51 of the frame 42. The arm 53 is locked into position by twisting the arm 53 and hooking the lower end 55 around the edge of the frame 42, as shown in FIG. 19c.

FIG. 20a through FIG. 20e exemplify an alternative frame assembly 1 for mounting an electrical component in a wall opening. Frame 42 is a unitary structure dimensioned with a perimeter corresponding to the contour of a substrate wall opening such as shown in FIG. 4. Flanges 51, along the side edges of the frame extend outward to overlap the outer side of the wall substrate. Flanges 56 extend from the bottom edge of frame 42 at the inner side of the wall substrate. Flanges 56 are comprised of flexible material to accommodate variations in thickness of the wall substrate. Arms 57 are pivotable about axis 58 on each inner side of frame 42, as shown in the perspective view of FIG. 20a. The arms 57 each comprise a surface portion that is perpendicular to the axis and a flange portion that is substantially parallel to the plane of the wall. The flange portion terminates in a curved surface 59.

FIG. 20b is a side view of the frame assembly 42 as it is about to be inserted into the wall opening. The bottom side of the frame is positioned at an angle with the bottom side of the wall opening such that flanges 56 are in contact with the inner edge thereof. The frame is then rotated to the position shown in the side view of FIG. 20c until flanges 51 are in contact with the outer surface of the wall substrate. Flanges 56 and 51 sandwich the wall substrate. At this time arms 57 are pivoted inwardly toward the center of the frame to clear the wall opening, as can be seen more readily in the plan view of FIG. 20d. To retain the upper portion of frame 42 to the wall, the arms 57 are rotated outwardly and ramp up on the sloped surface 59 of the arm onto the drywall 2 and apply pressure on the backside of the drywall 2 compressing it against the front flange 51 of the frame 42, as shown in the side view of FIG. 20e and plan view of 20f.

FIG. 21a through FIG. 21e exemplify an alternative frame assembly 1 for mounting an electrical component in a wall opening. Frame 42 is a unitary structure dimensioned with a perimeter corresponding to the contour of a substrate wall opening such as shown in FIG. 4. As shown in the perspective view of FIG. 21a, upper and lower sliders 60 are coupled to the sides of frame 42 via channel portions 63. Unitary to the sliders are flanges 7 that extend vertically, similar to the configuration of flanges 7 of FIG. 1. The channels permit movement of the sliders in the vertical direction. Holes 62 in the slider walls can mate with dimples 61 on the frame side walls to prevent inadvertent slider movement.

Figure 21A:
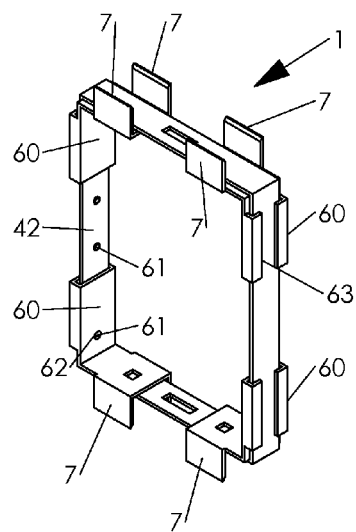
FIGS. 21a-21e exemplify another alternative frame assembly arrangement.
Figure 21B:
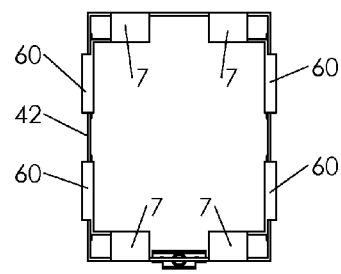
Figure 21C:
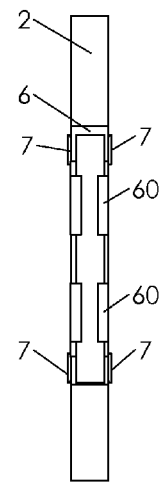
Figure 21D:
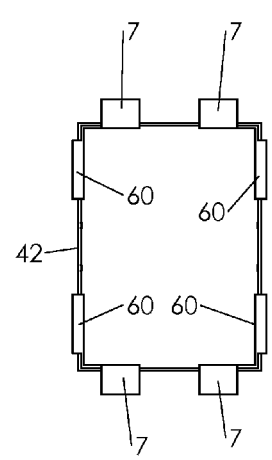
Figure 21E:
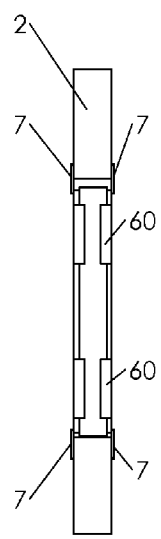

Before insertion of the frame 42 in the wall opening, the sliders are located in the compressed vertical positions illustrated in the plan view of FIG. 21b. As the flanges 7 are within the periphery of the frame 42, the frame 42 can then be directly inserted in the wall opening 6, as shown in the side view of FIG. 21c. Once in position, sliders are extended to their maximum vertical distance as shown in the plan view of FIG. 21d. This slider positioning can be maintained by appropriately mating holes 61 in the sliders with the dimples 61 on the frame walls. In this extended position, opposing flanges 7 sandwich the drywall as shown in the side view of FIG. 21e.

Figure 22A:
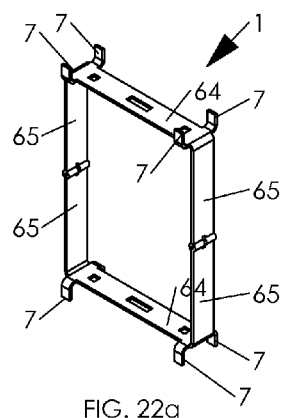
FIGS. 22a-22c exemplify another alternative frame assembly arrangement.
Figure 22B:
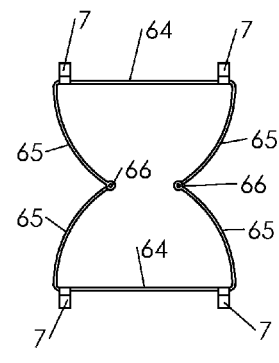
Figure 22C:
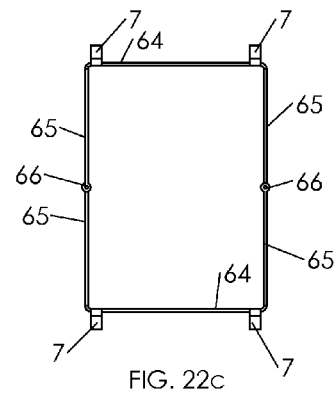

FIG. 22a through FIG. 22c exemplify an alternative frame assembly 1 for mounting an electrical component in a wall opening. Two frame elements 64 have legs 65 that are hinged together at axes 66, as depicted in the perspective view of FIG. 22a. The perimeter of frame elements 64 correspond to the contour of a substrate wall opening such as shown in FIG. 4. Flanges 7 extend vertically, similar to the configuration of flanges 7 of FIG. 1. To insert the frame in the wall opening, inward pressure is applied to legs 65 at axis 66, which then flex inwardly as shown in the side view of FIG. 22b. The height of the frame is thereby reduced so that the flanges 7 are within the periphery of the wall opening contour. Once positioned in the opening, the legs 65 are released, they return to their vertical extent to force the opposing flanges 7 on the upper and lower ends of the frame assembly 1 to sandwich the wall substrate.

Figure 23A:
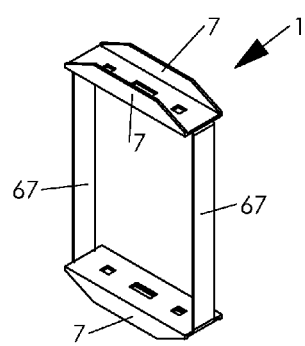
FIGS. 23a-23c exemplify another alternative frame assembly arrangement.
Figure 23B:
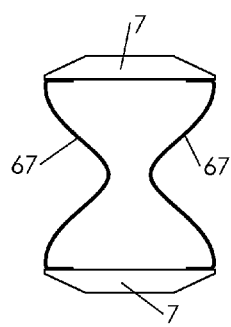
Figure 23C:
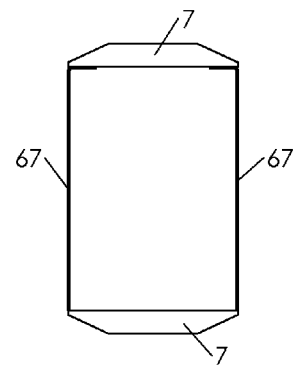

FIG. 23a through FIG. 23c exemplify an alternative frame assembly 1 for mounting an electrical component in a wall opening. As shown in perspective view in FIG. 23a, the frame assembly comprises sidewalls 67. Top and bottom sides are formed with flanges 7 that extend in the vertical direction. Sidewalls 67 are comprised of spring metal material. To insert the frame assembly into a corresponding opening in a wall substrate, sidewalls 67 are squeezed together to reduce the height of the frame assembly 1, as shown in the plan view of FIG. 23b. The flanges 7 will then be within the periphery of the wall opening contour to permit insertion in the wall opening. Once positioned in the opening, the sidewalls 67 are released to return to their vertical extent, forcing the opposing flanges 7 on the upper and lower ends of the frame assembly 1 to wedge onto the wall, as shown in FIG. 23c.

Figure 24A:
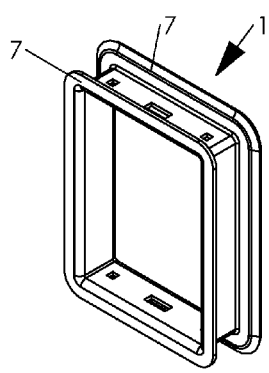
FIGS. 24a-24b exemplify another alternative frame assembly arrangement.
Figure 24B:
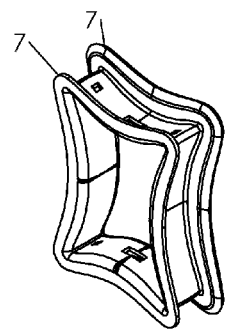

FIG. 24a and FIG. 24b exemplify an alternative frame assembly 1 for mounting an electrical component in a wall opening. Frame 1 is of unitary elastomeric construction with flanges 7 extending outwardly from the perimeter at opposite sides, as shown in the perspective view of FIG. 24a. To insert the frame 1 into a corresponding opening in a wall substrate, compression can be applied to the sides of the frame to reduce the peripheral area and allow clearance of the flanges 7. The reduced configuration is depicted in the perspective view of FIG. 24b. After insertion, the compression force is released, thereby permitting the frame to expand to the original position and wedge the opposing flanges 7 onto the perimeter of the opening in the wall substrate.

FIG. 25a shows a frame 68 mounted to a wall stud 69 with telecom tabs 14, as shown in FIG. 5 through 7b. Nails or screws through holes 70 fasten the frame 68 to the stud 69 during the rough-in stage of construction or renovation, prior to erection of the drywall.

FIG. 25b shows the stud mounted frame 68 of FIG. 25a with an electrical box 20 mounted thereto. Box 20 is mounted using sprung clips 21, such as shown in FIG. 9 through FIG. 14, secured to the bottom and top of the box 20; for example, with threaded fasteners 27. Also visible are tapped holes 38 to receive screws through ears of electrical boxes, also shown in FIG. 15, in the absence of spring clips.

FIG. 25c shows the frame 68, electrical box 20, spring clip 21 and fastener 27 of FIG. 25b in plan view with the drywall 2 shown. The box 20 extends from the frame 68 so that the box 20 is flush with the front of the drywall 2. Also visible are the sprung clip teeth 22 in the holes 26, also shown in FIG. 11, of the frame 68, as well as a slot 16 in the frame 68 to accept a telecom tab.

Figure 26A:
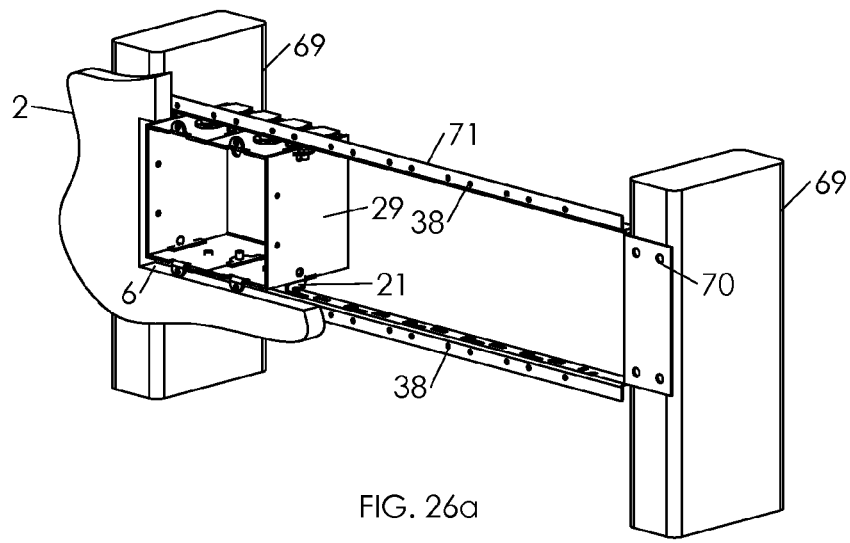
FIGS. 26a-26f exemplify an alternative embodiment to the embodiment of FIGS. 25a-25c.
Figure 26B:
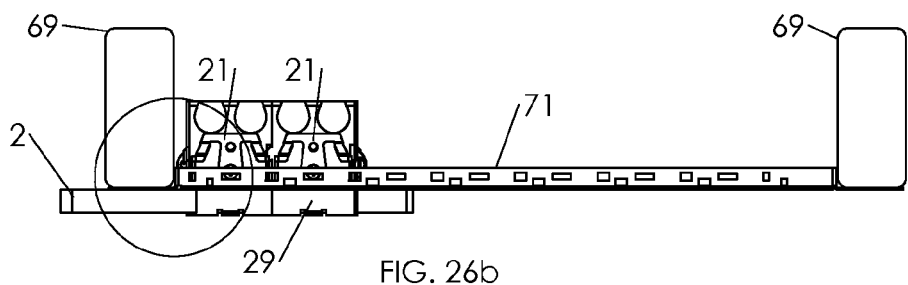
Figure 26C:
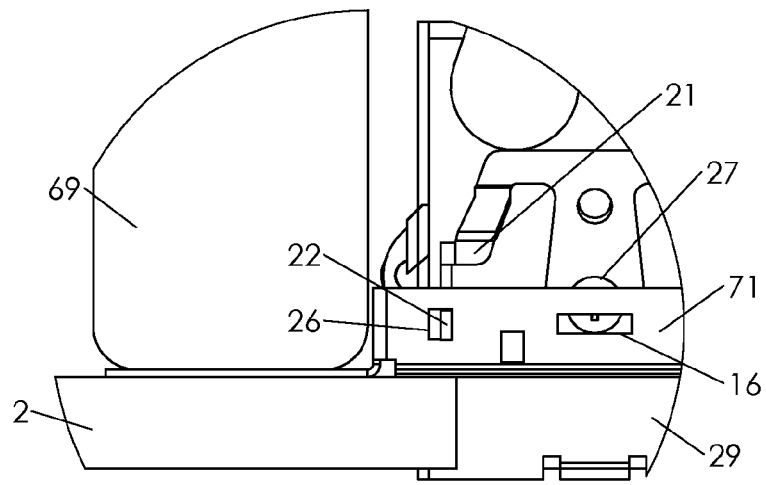

FIG. 26a, FIG. 26b and detail FIG. 26c show a multi-gang frame 71 mounted on two studs 69 spaced at industry standard center to center distance with a two gang electrical box assembly 29 mounted therein. Nails or screws through holes 70 fasten the frame 71 to the studs 69. The box assembly 29 is mounted using sprung clips 21, such as shown in FIG. 9 through FIG. 14, with threaded fasteners 27. Also visible are tapped holes 38 to receive screws through ears of electrical boxes, also shown in FIG. 15, in the absence of sprung clips. A cutaway sheet of drywall 2 is shown in front of the frame 71 and flush with the front of the electrical box 20. The opening 6 in the drywall 2 can be cut to accommodate the number of boxes or telecom plates that are installed in the frame up to a maximum of 7 in this embodiment. Also visible are the sprung clip teeth 22 in the rectangular holes 26, also shown in FIG. 11, of the frame 71, as well as a slot 16 in the frame 71 to accept a telecom tab.

Figure 26D:
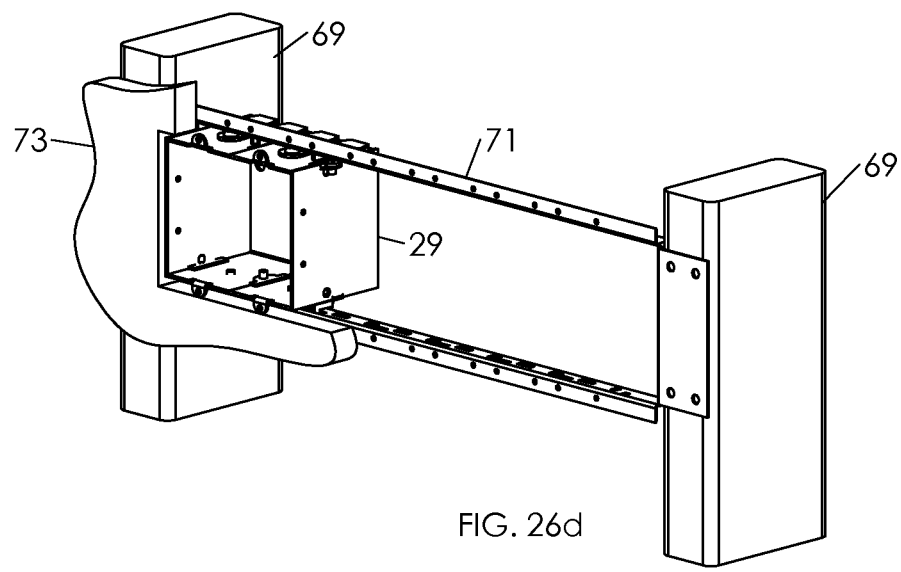
Figure 26E:
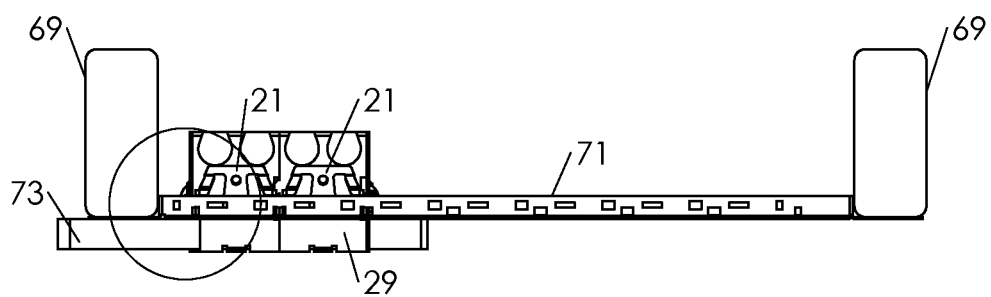
Figure 26F:
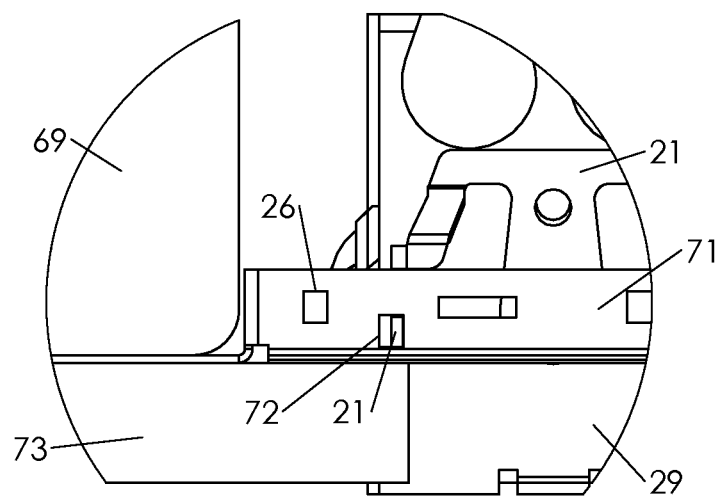

FIG. 26d, FIG. 26e and detail FIG. 26f show the stud 69 mounted multi-gang frame 71 shown in FIG. 26a, FIG. 26b and FIG. 26c with the same two gang electrical box assembly 29 mounted for thicker drywall 73 than in the previous figures. In order for the front of the electrical box assembly 29 to be flush with the thicker drywall 73, the box assembly 29 is shifted so the sprung clip teeth 22 engage rectangular holes 72 in the frame 71 which are positioned forward of the rectangular holes 26 for the thinner drywall.

Figure 28A:
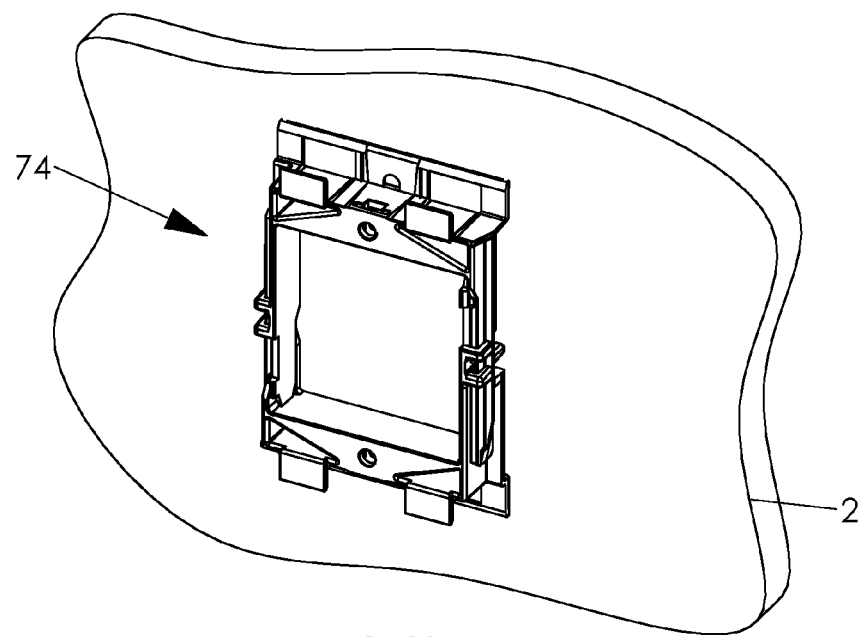
FIG. 28a is a perspective view of the compressed frame assembly.
Figure 28B:
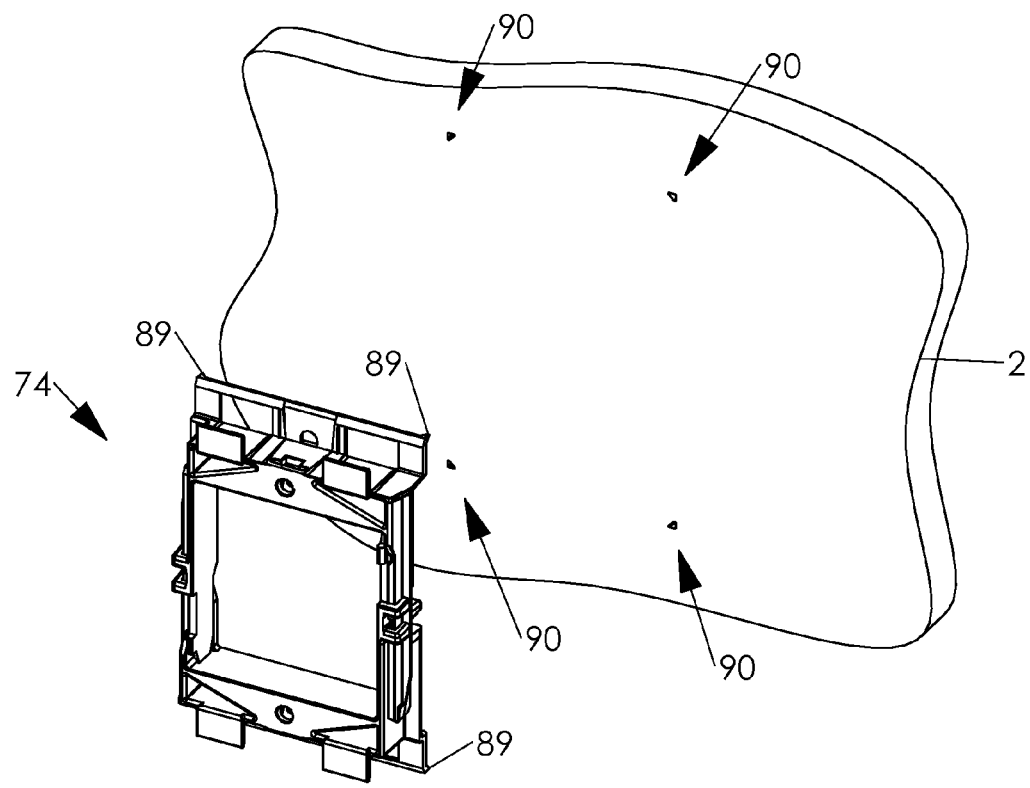
FIG. 28b is a perspective view of the compressed state low voltage frame assembly.
Figure 28C:
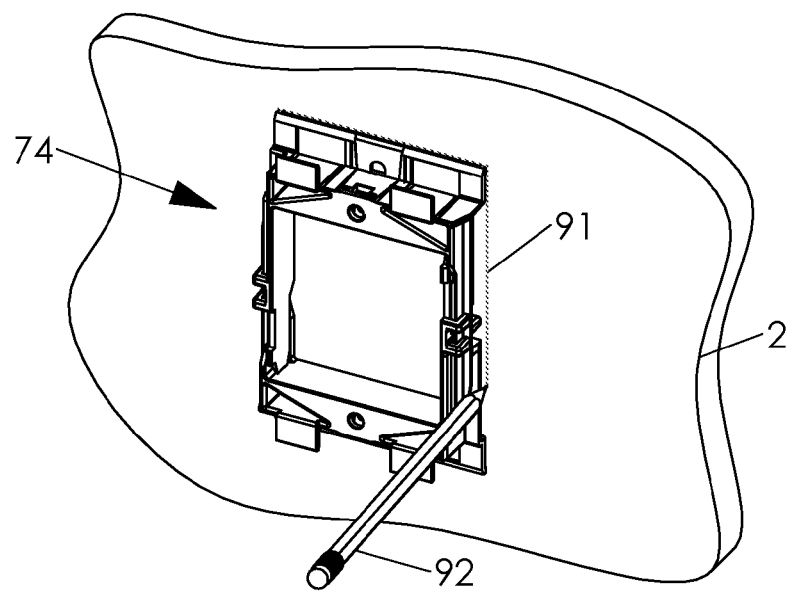
FIG. 28c is a perspective view that shows an alternative to FIG. 28b.

In FIGS. 27a-e, low voltage frame assembly 74 is shown in the compressed state. Frame assembly 74 comprises two frame portions 75. Although the frame portions 75 need not be identical, they are illustrated herein as substantially identical and referred to as "half-frames" 75. In each half frame 75, sprung element 78 is formed with detent 8 that engages groove 76 in rigid element 79 of the opposing half frame 75. Detents 8 in grooves 76 temporarily keep the frame assembly 74 in the compressed position. Groove 76 has ramp 77 on one side that allows detent 8 to ride out of groove 76 as the frame assembly 74 is expanded. Surface 80 on sprung element 78 bottoms out on surface 81 of the opposing half frame 75 preventing over compression of frame assembly 74. Teeth 82 on sprung element 78 retain rigid element 79. Spikes 89 located on the backside outer corners of the frame assembly 74 facilitate marking and cutting the hole in the substrate as shown in FIG. 28a-c. Although half-frames 75 are depicted as being symmetrical, each side of the half frame may be different in length from each other.

Figure 27A:
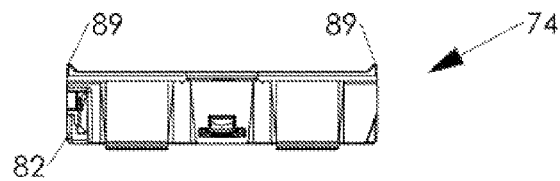
FIGS. 27a-d are orthographic views of an alternative low voltage frame assembly in a compressed state.
Figure 27B:
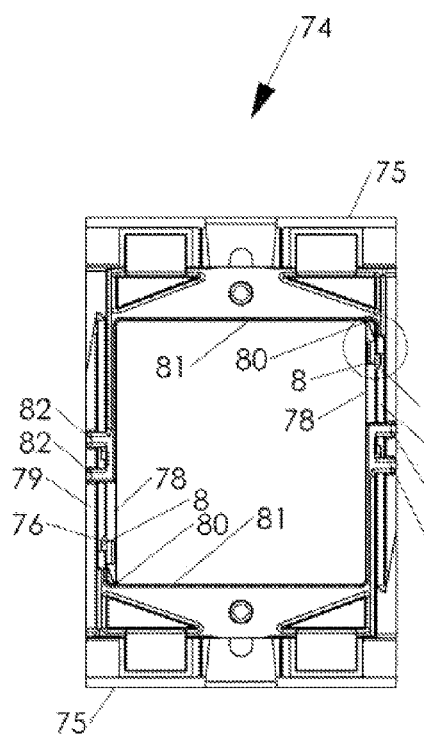
Figure 27C:
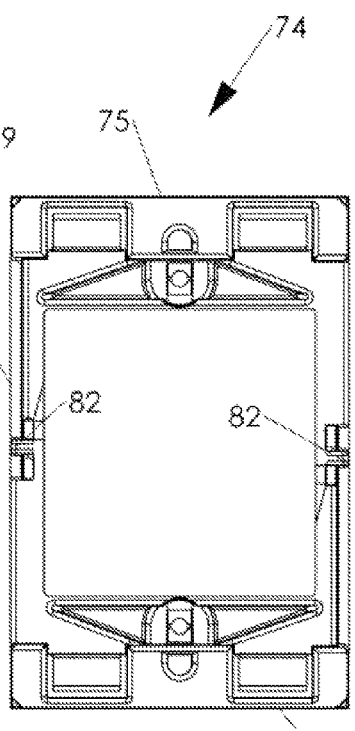
Figure 27D:
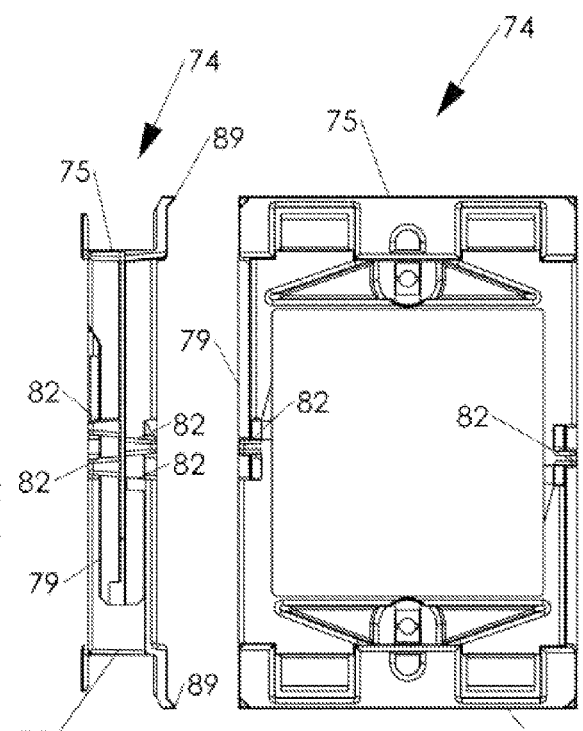
Figure 27E:
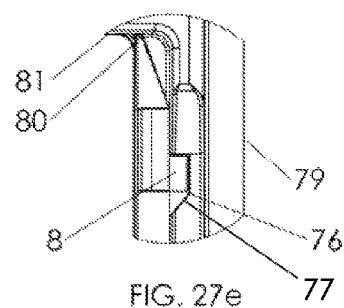
FIG. 27e is a detail view taken from FIG. 27b.
Figures 27F, 27G, 27H:
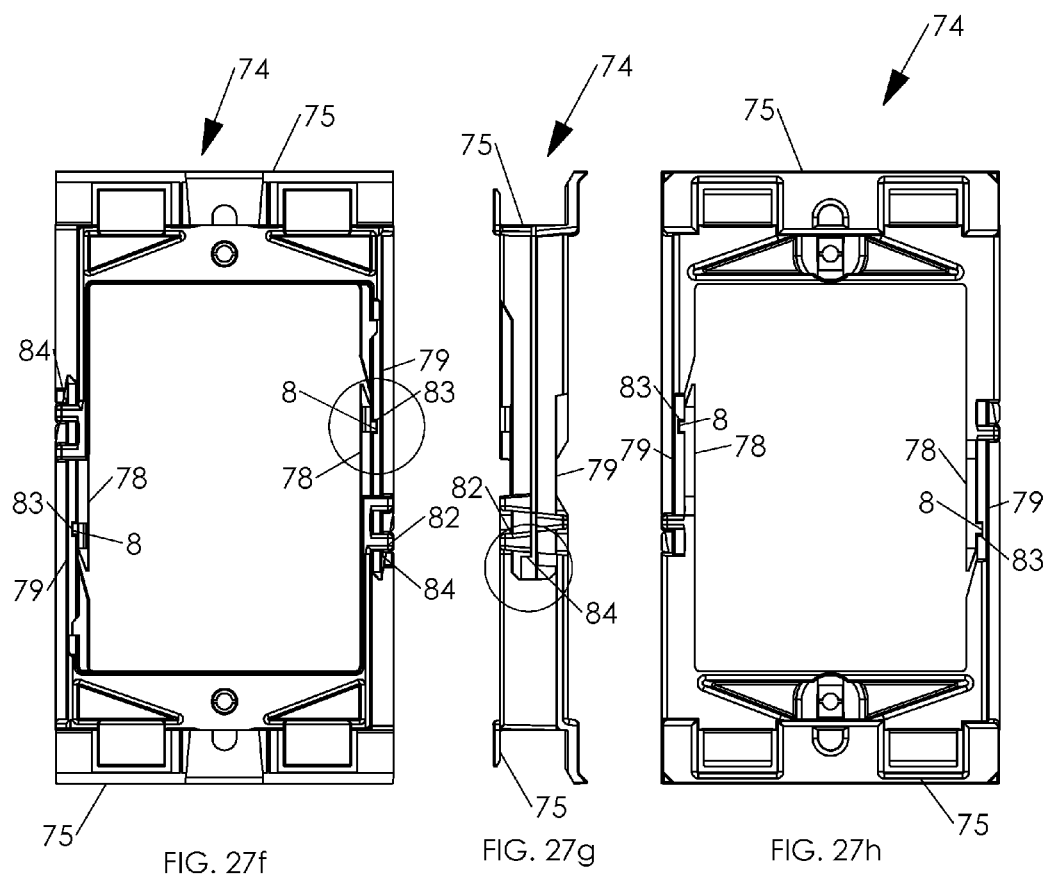
FIGS. 27f-h are orthographic views of the low voltage frame assembly shown in FIGS. 27a-e in an expanded state.
Figures 27I, 27J:
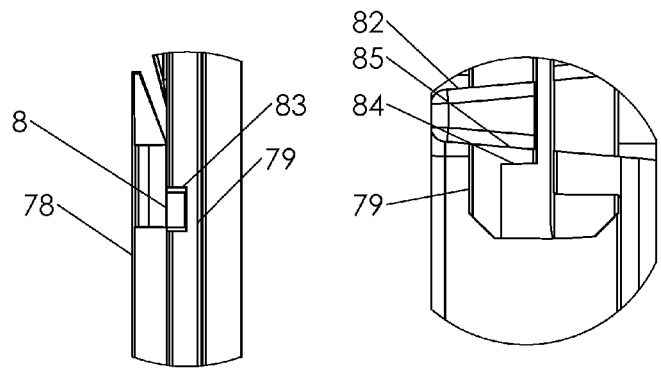
FIG. 27i is a detail view taken from FIG. 27f.
FIG. 27j is a detail view taken from FIG. 27g.

Low voltage frame assembly 74 is shown in the expanded state in FIGS. 27f-h. As the half frames 75 are pulled apart from the compressed state, sprung element 78 flexes as detent 8 runs along the inside surface of rigid element 79. When detent 8 reaches groove 83 it locks in place, as seen in detail FIG. 27*i*. Detents 8 engage grooves 83 on rigid element 79 to keep the frame assembly 74 in the expanded state with the proper dimension between half frames 75 to fit the hole in the wall substrate correctly and to be able to mount a low voltage electrical device. As shown in FIG. 27*j*, barb 84 of rigid element 79 contacts surface 85 of tooth 82, preventing the inadvertent overexpansion and disassembly of frame assembly 74.

FIG. 27*k* is an exploded view of the low voltage frame assembly 74. Sheet spring steel round spring nuts 86 are inserted into cavity 87 in half frame 75 as shown in FIG. 27*l*. FIG. 27*m* shows a perspective view of the compressed low voltage frame assembly 74, while FIG. 27*n* shows it in its expanded state. On the front on either side of the frame assembly 74 two rectangular tabs 88 protrude. Tabs 88 can be squeezed toward each other to flex sprung element 78 and disengage detent 8 from groove 83 to allow compression of frame assembly 74 and removal from the drywall.

Figure 28D:
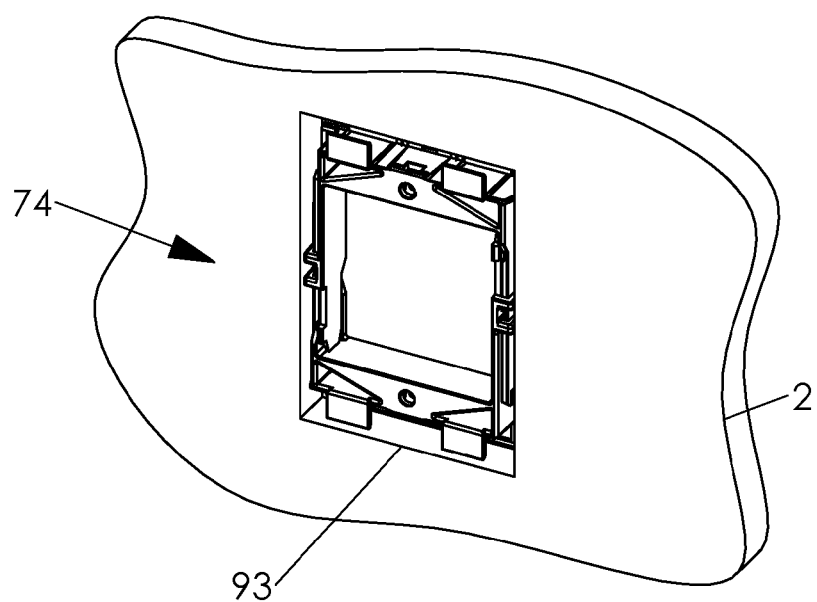
FIG. 28d is a perspective view of the compressed frame assembly inserted in the hole in the substrate.

The first step of a process of installation of the assembly in an uncut wall substrate, the assembly in its compressed state can be pushed against an exposed surface of the substrate at a location in which the electrical device is to be installed. This step is illustrated in FIG. 28*a*. Spikes 89, shown in FIGS. 27*a-d*, extend from the back four corners of frame assembly 74 to create depressions 90 in substrate 2, as seen in FIG. 28*b* after removal of the spikes from the substrate. These depressions can be used as a template for performing orthogonal straight cuts through substrate 2 between depressions 90 to produce hole 93, shown in FIG. 28*d*, that is the correct size for installation of frame assembly 74. Alternatively, as shown in FIG. 28*c*, spikes 89 can pierce the outside surface of the substrate to nest in indentations created thereby to momentarily hold compressed frame assembly 74 stationary while a perimeter cut line 91 is traced around frame assembly 74 with pencil 92. Cutting along line 91 will produce hole 93 in drywall 2 that of appropriate size.

Figure 28E:
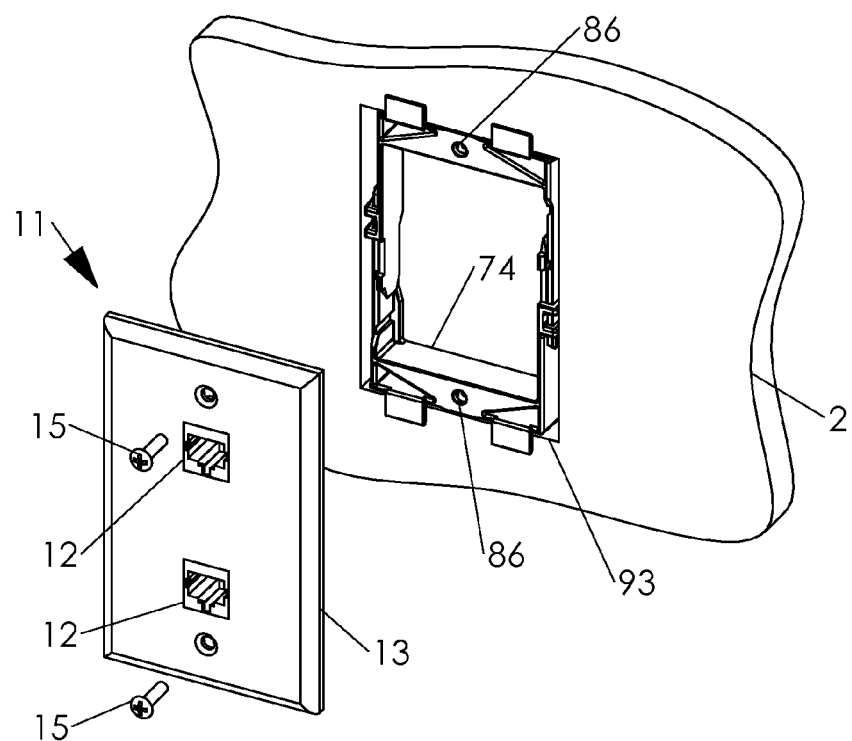
FIG. 28e is an exploded perspective view of the frame assembly expanded in the hole in the substrate and a cover plate.
Figure 28F:
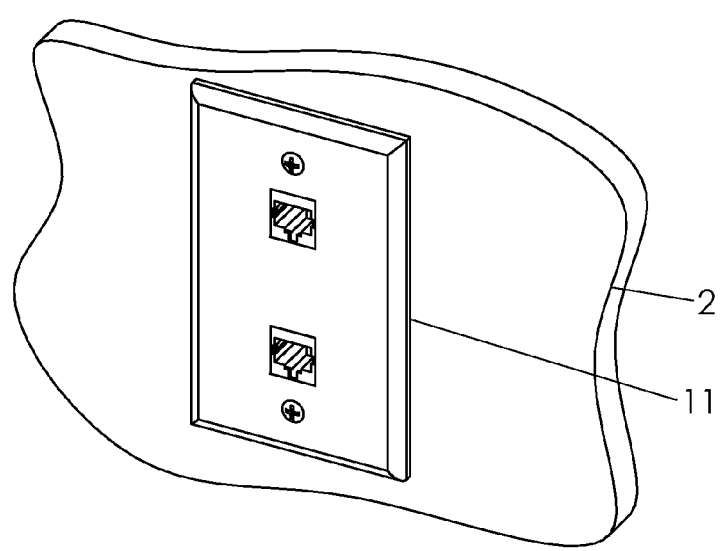
FIG. 28f exemplifies the completed installation of the exploded assembly shown in FIG. 28e.
Figure 29A:
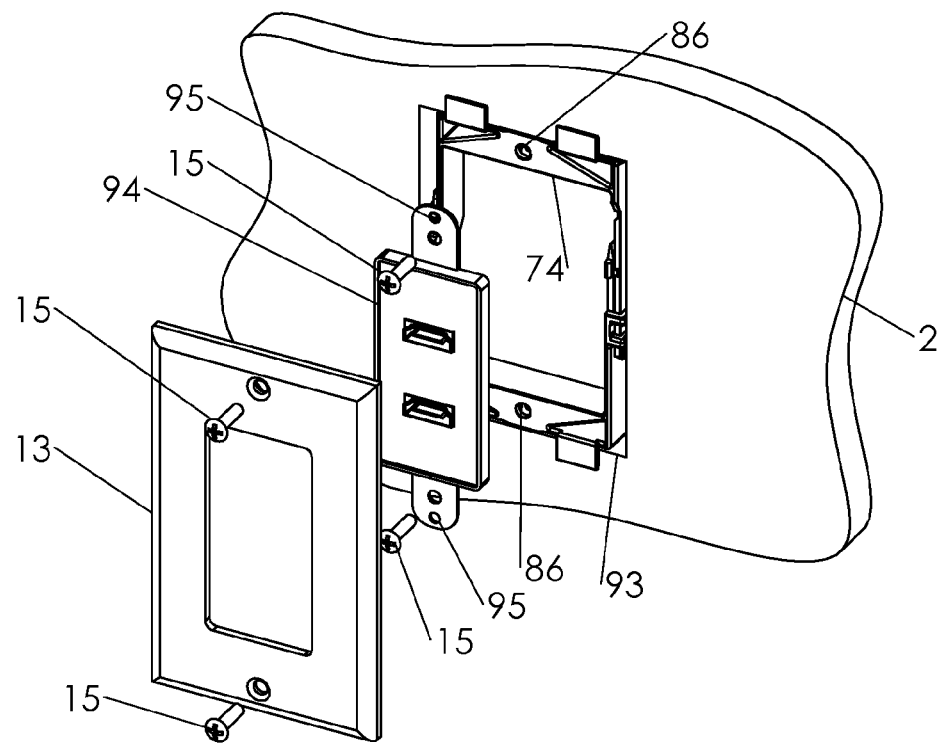
FIG. 29a is a view of an installation similar to that shown in FIG. 28e.
Figure 29B:
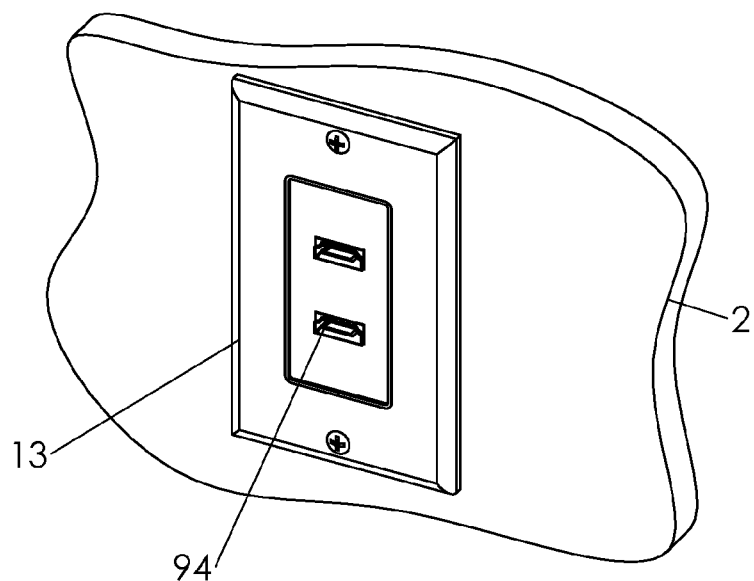

FIG. 28*e* is an exploded perspective view of frame expanded assembly 74 situated in hole 93 in wall substrate 2 for receiving and retaining integral cover plate low voltage device assembly 11, exemplified by cover plate 13 and ethernet jacks 12. With jacks 12 wired, mounting screws 15 can be pushed into spring nuts 86 with final tightening accomplished with a screwdriver. The final installation of the low voltage assembly in the wall is illustrated in FIG. 28*f*. Installation can alternatively be exemplified as shown in FIGS. 29*a-b*. Low voltage device 94 can first be mounted to frame assembly 74 by pushing screws 15 into spring nuts 86 and tightening with a screwdriver and thereafter screwing cover plate 13 onto the threaded outside holes 95 on low voltage device 94.

FIGS. 30*a-g* depict a modification of half frame 75. Ribs 96 on back flange 97 score the backside of the drywall surface to increase the compression of the drywall by front flange 98 and back flanges 97 to provide lateral stability of the assembly in the drywall.

Figure 31G:
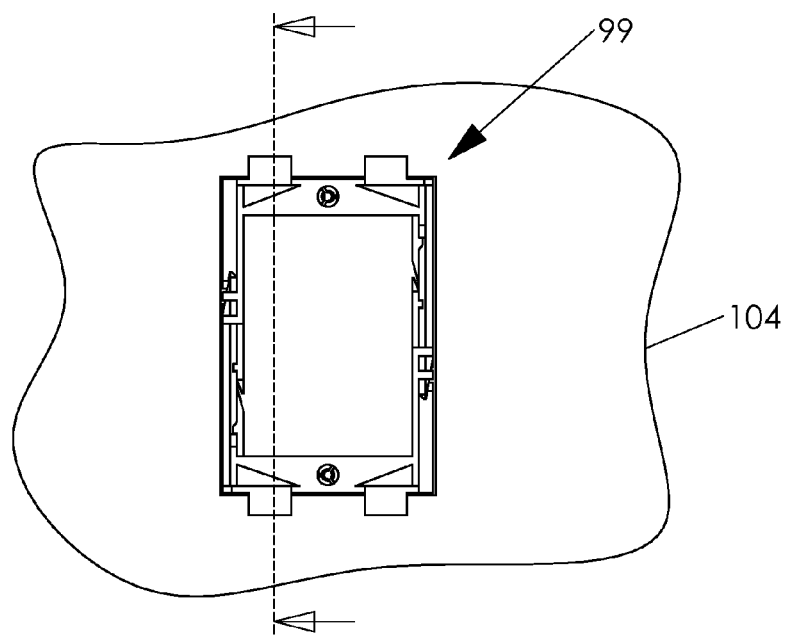
FIG. 31g is a front view of the installation shown in FIG. 31e.
Figures 31H, 31I:
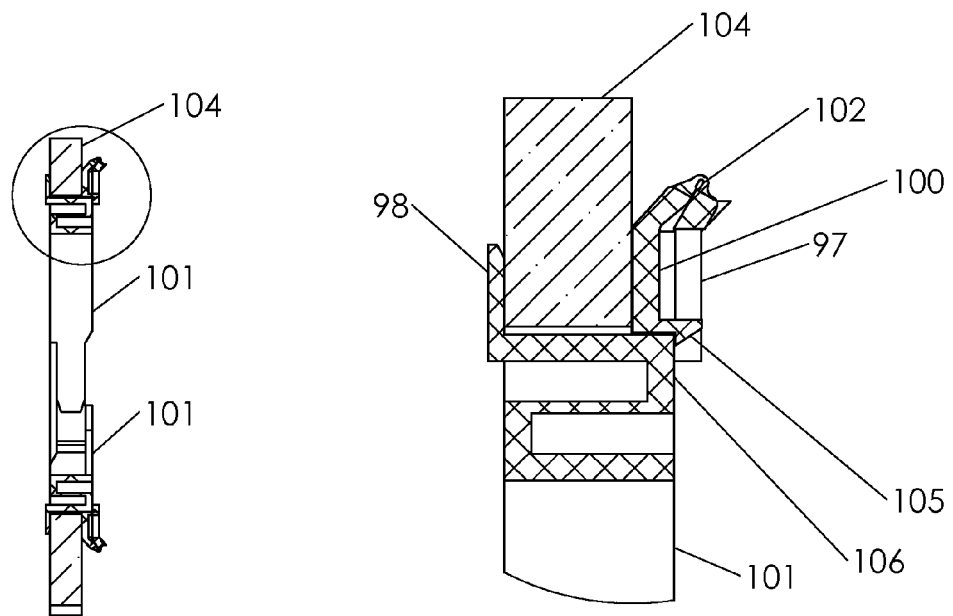
FIG. 31h is a section view taken from FIG. 31g.
FIG. 31i is a detail view taken from FIG. 31h.

FIGS. 31*a-i* are illustrative of a further modification. Spacer frame assembly 99 can be installed in a wall substrate of two different thicknesses. Spacer 100 is connected to spacer half frame 101 from back flange 97 via flexible web 102. FIGS. 31*a-c* show spacer frame assembly 99 with spacers 100 in an extended position, unused, for installation in thicker wall substrate 103. FIGS. 31*d-i* show spacers 100 in a folded position for installation in thinner wall substrate 104. Spacer 100, when folded, reduces the gap dimension between front flange 98 and back flange 97 that would occur with a thinner substrate width. Spacer 100 becomes compressed within the gap as spacer frame assembly 99 is expanded into position. Sprung barbed element 105, extending from spacer 100, is latched on surface 106 of spacer half frame 101, as shown in FIG. 31*i*. Sprung barbed element 105 ensures that spacer 100 remains in the folded position, unless unlatched prior to installation.

In an alternative embodiment, exemplified in FIGS. 32*a-c*, integrally molded spring nut 108 is molded into the plastic material of the frame portion. The spring nut comprises a cone that is segmented longitudinally into three equal parts to form arms 109. An internal thread 110 of prescribed dimensions is located at the end of each arm 109 to match a conventional screw. Arms 109 with integral threads 110 flex outward as the screw is pushed in. Threads 110 engage in the screw as it is tightened with a screwdriver and resist linear extraction force. The illustrated spring nut, as shown, merely exemplifies various configurations including a various number of conical segments and/or internal threads.

FIGS. 33*a-f* depict an alternative means of mounting a low voltage device to a frame assembly without requiring mounting screws. Frame 111 comprises two half frames 112, each with cantilevered flexible barbed element 113. Integral cover plate low voltage device 114 comprises, for example, ethernet jacks 12 and retainer 115 to receive flexible barbed elements 113 of the frame assembly. FIG. 33*f* is an enlarged detail view of this arrangement. To remove integral cover plate low voltage device 113, a flat head screw driver or the like can be inserted through openings 116 to disengage flexible barbed element 113 from retainer 115.

Figure 34A:
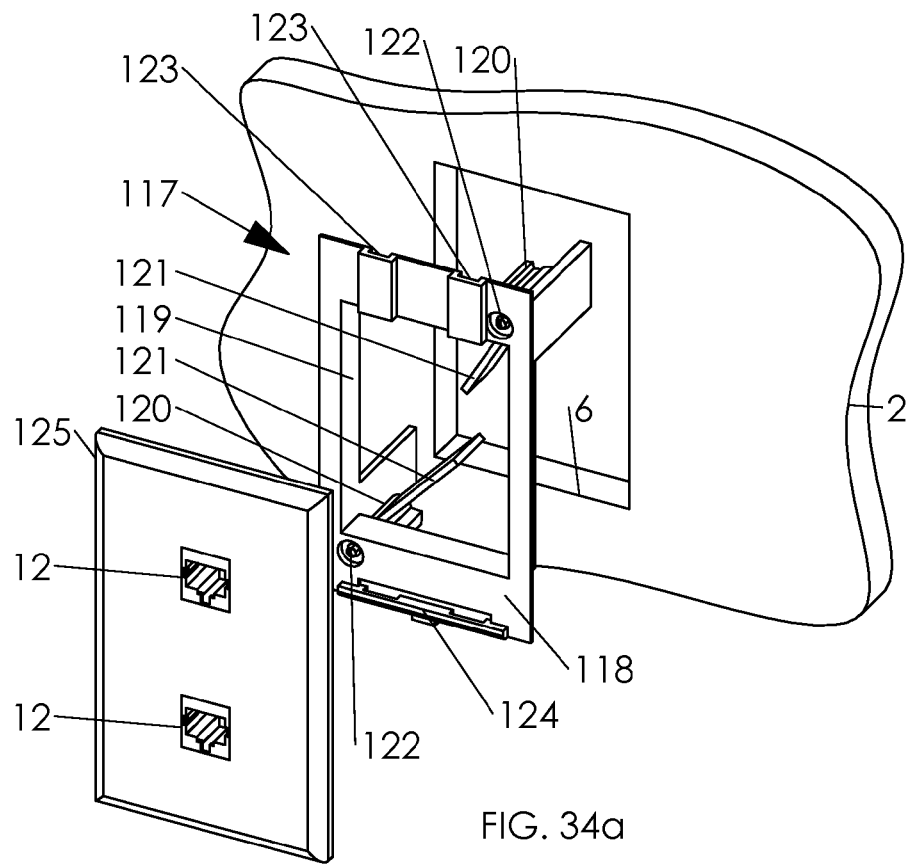
FIG. 34a is an exploded view of an alternate embodiment.
Figure 34B:
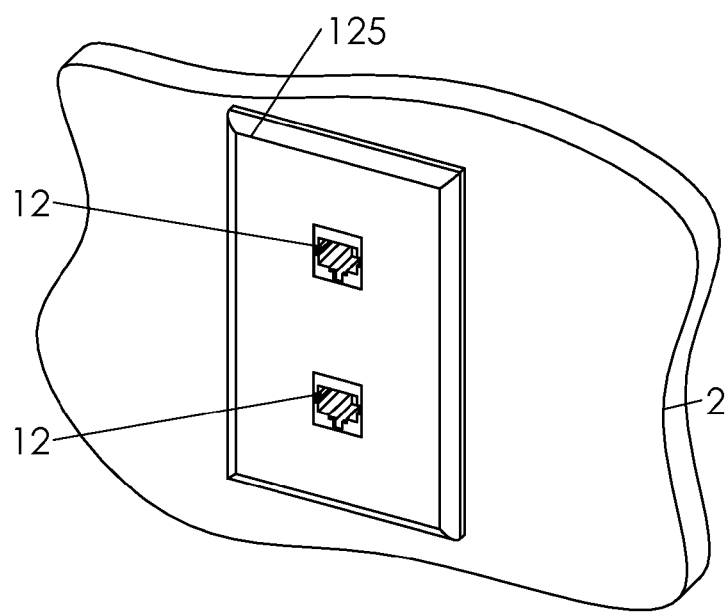
Figure 34C:
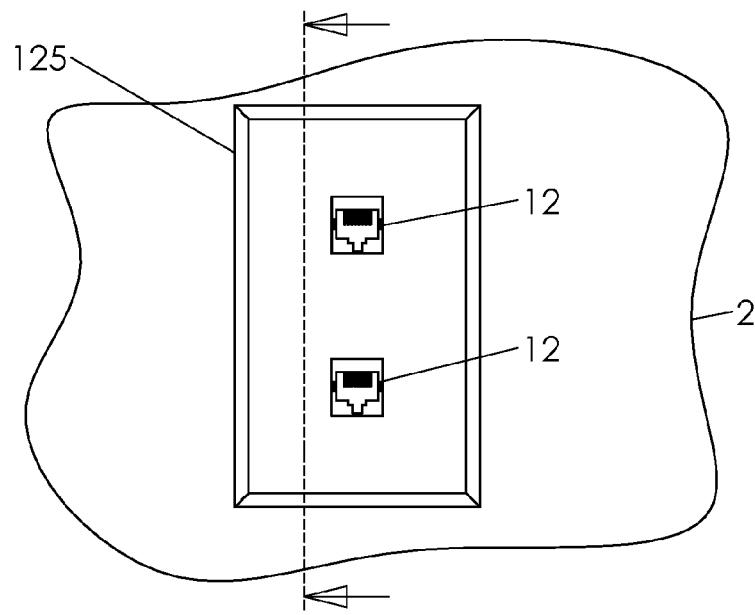
FIG. 34c is a front view of the installed assembly shown in FIG. 34b.
Figure 34D:
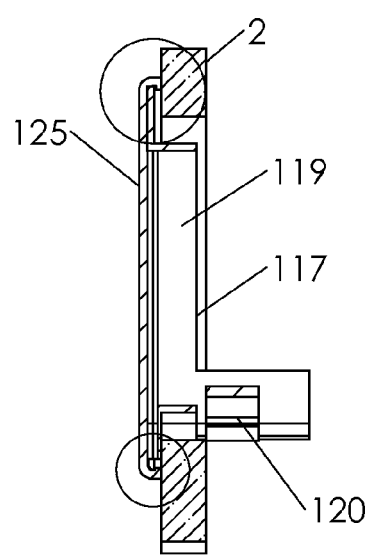
FIG. 34d is an aligned section view taken from FIG. 34c.
Figure 34E:
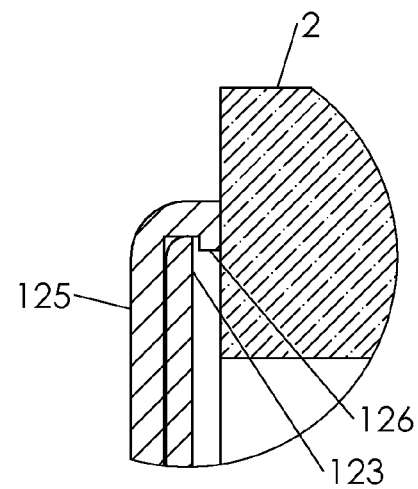
FIG. 34e is a top detail view taken from FIG. 34d.
Figure 34F:
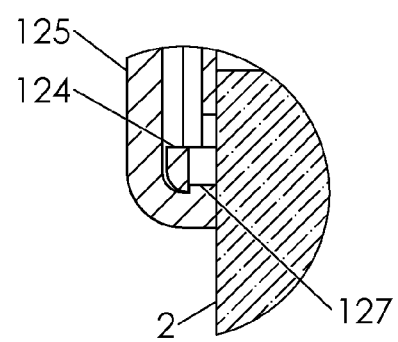
FIG. 34f is a bottom detail view taken from FIG. 34d.
Figure 34G:
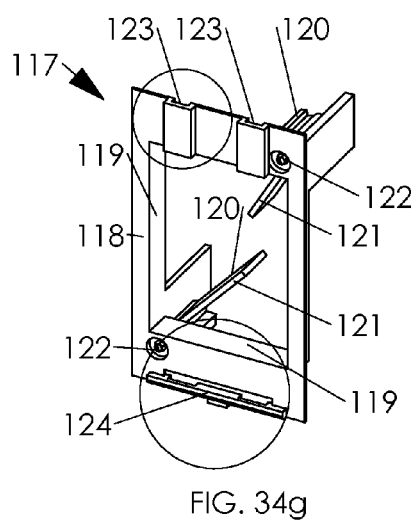
Figure 34H:
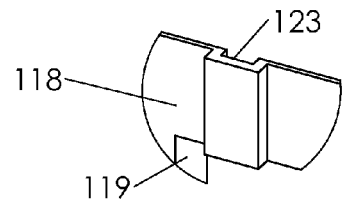
FIG. 34h is a detail view of the frame shown in FIG. 34g.
Figure 34I:
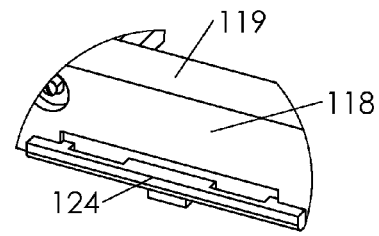
FIG. 34i is a detail view of the bottom of the frame shown in FIG. 34g.
Figure 34J:
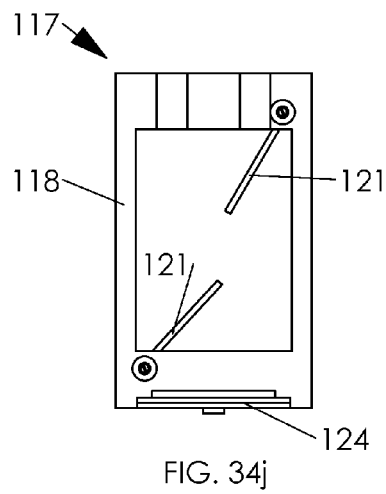
FIGS. 34j-l are orthographic views of the frame shown in FIG. 34g.
Figure 34K:
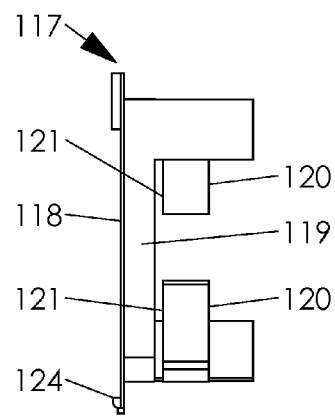
Figure 34L:
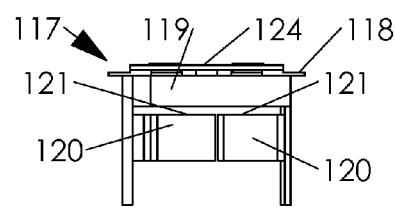
Figure 34M:
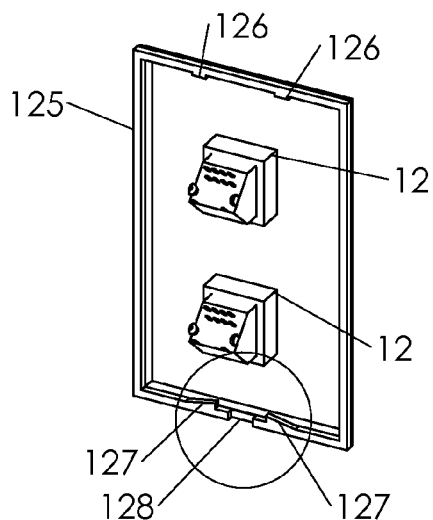
Figure 34N:
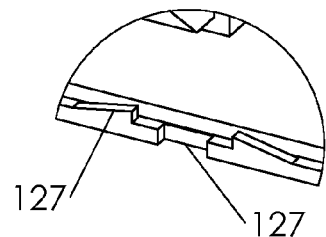
FIG. 34n is a detail view of the bottom of the frame shown in FIG. 34m.
Figure 34O:
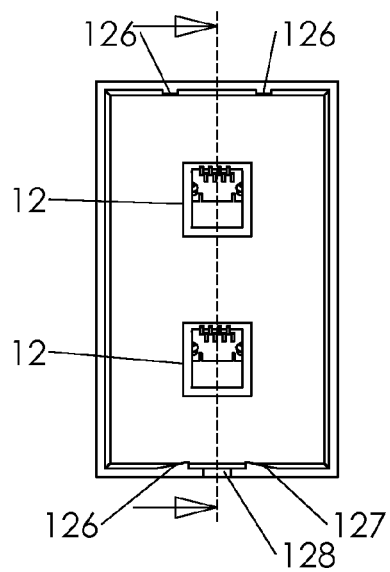
FIG. 34o is a back view of the device cover plate assembly from FIG. 34m.
Figure 34P:
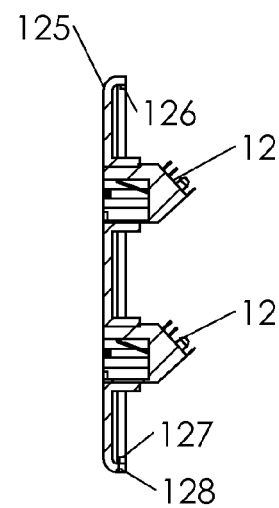
FIG. 34p is a section view taken from FIG. 34o.
Figure 34Q:
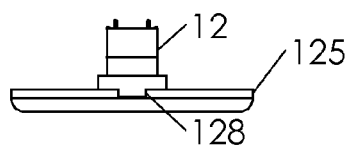
FIG. 34q is a bottom view of the device cover plate assembly shown in FIG. 34o.

FIGS. 34*a-q* depict yet another alternate embodiment of a low voltage device mounting arrangement with the frame assembly. In operation, low voltage frame 117, comprising front flange 118 and four inwardly extending walls 119 having pivot arms 120, is inserted through hole 6 in substrate 2. Pivot arms 120 are rotated behind substrate 2 and a screwdriver, or the like, is used to tighten screws 122. Surface 121 of pivot arms 120 is thus pulled against the backside of substrate 2 to secure frame 117 in position. Cavities 123 on the top and flexible member 124 on the bottom of frame 177 receive and secure device cover plate 125. Device cover plate 125, containing low voltage devices 12, comprises downwardly extending hooks 126 on the top and tapered upwardly extending retainers 127 on the bottom. Device cover plate 125 can be secured to frame 117 by hooking hooks 126 into cavities 123 then pushing the lower portion of device cover plate 125 against frame 117. Tapered retainers 127 will flex member 124 upwardly. Ultimately, once tapered retainers 127 extend beyond member 124, member 124 snaps down to retain tapered retainers 127. Device cover plate 125 can be removed by flexing member 124 with a screwdriver or the like up through aperture 128 in device cover plate 125, thereby disengaging tapered retainers 127 and permitting hooks 126 to be removed from cavities 123.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, any of the various disclosed arrangements for mounting the components may be utilized with the frame assemblies described in FIGS. 16-24. Although threaded fasteners have been illustrated in some of the drawing figures for attachment to the mountings, it should be understood that other well known fastening means are contemplated in lieu thereof.

What is claimed is:

1. A bracket assembly comprising:
   first and second opposing frame portions movable in opposite directions with respect to each other; wherein:
   the bracket assembly is expandable for contact with an opening in an existing building wall;
   each frame portion comprises a plurality of flange members spaced from each other in a direction of the thickness of the wall, each of the flange members extending outwardly from the frame perimeter for contact with outer and inner surfaces, respectively, of the building wall; and
   each of the opposing frame portions comprises first and second sides, the first side comprising a detent on an outer surface thereof and the second side comprising at least one groove on an inner surface thereof.

2. A bracket assembly as recited in claim 1, wherein each frame portion comprises a spring nut for mounting an electrical device.

3. A bracket assembly as recited in claim 1, wherein the first side is relatively flexible with respect to rigidity of the second side.

4. A bracket assembly as recited in claim 3, wherein the groove extends less than the entire thickness dimension of the second side.

5. A bracket assembly as recited in claim 1, wherein the surfaces of opposing frame portions face each other, and the detents and grooves are dimensioned to provide engagement, respectively, between grooves and dents of facing frame portion surfaces.

6. A bracket assembly as recited in claim 5, wherein a first groove in each frame portion is located to define a passively biased resting position when engaged with a detent in the opposed frame portion to define a compressed bracket assembly state.

7. A bracket assembly as recited in claim 6, wherein the first groove terminates in a ramp configuration thereby facilitating disengagement of the detent.

8. A bracket assembly as recited in claim 6, wherein a second groove in each frame portion is located distally from the first groove for locking engagement with the detent to define an expanded bracket assembly state, the perimeter of the engaged frame portions in the expanded state conforming to the wall opening perimeter.

9. A bracket assembly as recited in claim 8, wherein the second side of each frame portion further comprises a lateral tab, wherein manual pressure on the tabs of each frame portion in a direction toward one another facilitates unlocking engagement of the assembly from its expanded state.

10. A bracket assembly as recited in claim 8 further comprising:
    a barb extending from a surface of the second side of each frame portion; and
    a tooth portion extending from a surface of the first side of each frame portion;
    wherein the barbs and tooth portions are positioned to limit extension of the frame portions beyond the expanded state, thereby avoiding inadvertent detachment thereof.

11. A bracket assembly as recited in claim 6, wherein a groove in each frame portion is located for locking engagement with the detent to define an expanded bracket assembly state, the perimeter of the engaged frame portions in the expanded state conforming to the wall opening perimeter.

12. A bracket assembly as recited in claim 1, wherein each flange comprises a plurality of spikes extending in an outward direction from a flange surface for temporary contact with a wall surface to determine the periphery of the wall opening to be formed.

13. A bracket assembly as recited in claim 12, wherein each flange comprises an inwardly protruding rib to provide lateral stability of the assembly in the wall.

14. A bracket assembly as recited in claim 1, wherein the wall opening periphery corresponds to a compressed state of the bracket assembly.

* * * * *